(12) United States Patent
Konishi

(10) Patent No.: US 9,709,790 B2
(45) Date of Patent: Jul. 18, 2017

(54) IMMERSION MICROSCOPE OBJECTIVE AND MICROSCOPE USING THE SAME

(71) Applicant: OLYMPUS CORPORATION, Shibuya-ku, Tokyo (JP)

(72) Inventor: Hirokazu Konishi, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 212 days.

(21) Appl. No.: 14/508,806

(22) Filed: Oct. 7, 2014

(65) Prior Publication Data

US 2015/0109681 A1 Apr. 23, 2015

(30) Foreign Application Priority Data

Oct. 17, 2013 (JP) ................. 2013-216435

(51) Int. Cl.
*G02B 21/33* (2006.01)
*G02B 27/00* (2006.01)

(52) U.S. Cl.
CPC ......... *G02B 21/33* (2013.01); *G02B 27/0068* (2013.01)

(58) Field of Classification Search
None
See application file for complete search history.

(56) References Cited

U.S. PATENT DOCUMENTS

| 5,982,559 | A | 11/1999 | Furutake et al. |
| 7,782,539 | B2 | 8/2010 | Shi et al. |
| 7,965,450 | B2 * | 6/2011 | Yonetani ................ G02B 21/02 359/656 |
| 2001/0043924 | A1 | 11/2001 | Carlton et al. |
| 2004/0161431 | A1 | 8/2004 | Carlton et al. |
| 2008/0106795 | A1 * | 5/2008 | Shi .................... G02B 27/0068 359/656 |

(Continued)

FOREIGN PATENT DOCUMENTS

| DE | 102008006826 A1 | 8/2009 |
| DE | 102008020345 A1 | 10/2009 |

(Continued)

OTHER PUBLICATIONS

Extended European Search Report dated Feb. 20, 2015, issued in counterpart European Application No. 14188303.3.

*Primary Examiner* — Scott J Sugarman
*Assistant Examiner* — Gary O'Neill
(74) *Attorney, Agent, or Firm* — Holtz, Holtz & Volek PC

(57) ABSTRACT

An immersion microscope objective includes, a first lens group, a second lens group, and a third lens group, wherein the first lens group has a positive refractive power and includes a first cemented lens disposed nearest to the object side in the first lens group, the second lens group includes a second cemented lens, the third lens group includes a lens component that has a positive refractive power and changes a divergent light beam incident from the second lens group to a convergent light beam, two lens components that change the convergent light beam to a divergent light beam, and a lens component that has a positive refractive power and changes the divergent light beam to a parallel light beam and emits the parallel light beam, and the following conditional expressions (1) is satisfied:

$$60 \text{ mm}^2 \leq d_0 \times f \times NA_o \leq 500 \text{ mm}^2 \quad (1).$$

9 Claims, 20 Drawing Sheets

(56) References Cited

U.S. PATENT DOCUMENTS

| | | | |
|---|---|---|---|
| 2008/0149867 A1* | 6/2008 | Konishi | G02B 21/0064 |
| | | | 250/582 |
| 2009/0027769 A1 | 1/2009 | Saito et al. | |
| 2010/0020062 A1 | 1/2010 | Liou et al. | |
| 2010/0182702 A1 | 7/2010 | Watanabe et al. | |
| 2010/0265574 A1 | 10/2010 | Kasahara et al. | |
| 2011/0043906 A1 | 2/2011 | Saito et al. | |
| 2011/0043924 A1 | 2/2011 | Saito et al. | |
| 2012/0113524 A1 | 5/2012 | Kasahara et al. | |
| 2013/0271829 A1 | 10/2013 | Kasahara et al. | |
| 2015/0109682 A1* | 4/2015 | Kasahara | G02B 21/02 |
| | | | 359/656 |

FOREIGN PATENT DOCUMENTS

| | | | |
|---|---|---|---|
| DE | 102011109783 A1 | 2/2013 | |
| EP | 2017663 A2 | 1/2009 | |
| EP | 2453286 A1 | 5/2012 | |
| EP | 2573608 A2 | 3/2013 | |
| EP | 2573609 A2 | 3/2013 | |
| EP | 2650714 A1 | 10/2013 | |
| JP | 10274742 A | 10/1998 | |
| JP | 11249024 A | 9/1999 | |
| JP | 2005189732 A | 7/2005 | |
| JP | 2010008989 A | 1/2010 | |
| JP | 2010160465 A | 7/2010 | |
| JP | 2010271693 A | 12/2010 | |
| JP | 2012118509 A | 6/2012 | |
| JP | 2013235246 A | 11/2013 | |
| JP | 5445909 B2 | 3/2014 | |
| JP | 5474579 B2 | 4/2014 | |
| JP | 5536995 B2 | 7/2014 | |

\* cited by examiner

IMMERSION MICROSCOPE OBJECTIVE AND MICROSCOPE USING THE SAME

CROSS-REFERENCE TO RELATED APPLICATION

The present application is based upon and claims the benefit of priority from the prior Japanese Patent Application No. 2013-216435 filed on Oct. 17, 2013; the entire contents of which are incorporated herein by reference.

BACKGROUND OF THE INVENTION

Field of the Invention

The present invention relates to an immersion microscope objective, and a microscope using the same.

Description of the Related Art

As a means of fluorescence observation, a method of fluorescence observation by multi-photon excitation has been known. In the multi-photon excitation, light of a wavelength in almost integral multiples of an absorption wavelength of a fluorescent substance is irradiated to a fluorescent material (sample) as excitation light. Here, a wavelength of the excitation light in the multi-photon excitation being almost an integral multiple of the absorption wavelength, energy of one photon of the excitation light is almost an integral submultiple for the multi-photon excitation as compared to a single-photon excitation. Therefore, in the multi-photon excitation, it is necessary to make a plurality of photons collide with one fluorescent substance simultaneously.

When the excitation light is converged by a microscope objective, a density of light becomes the highest at a focal position. Therefore, a probability of the plurality of photons colliding with the fluorescent substance becomes the highest at the focal position. In the multi-photon excitation, the fluorescent light is generated only at the focal position (or in the extreme proximity of the focal position). For making the density of light at the focal position high, it is necessary to make a diameter of a light spot formed at the focal position as small as possible. In view of such circumstances, the microscope objective is sought to have a large numerical aperture and a superior imaging performance. If the imaging performance is superior, a light spot in which, various aberrations have been corrected favorably, is formed at the focal position.

Moreover, the excitation light used in the multi-photon excitation is infrared light. Light has a feature of longer the wavelength, lesser is the susceptibility of scattering of light (Rayleigh scattering). Therefore, in a sample having a scattering characteristic such as of a biological sample, the infrared light having a long wavelength is capable of reaching up to even deeper position as excitation light. For observing a deep portion of a sample by using this feature, the microscope objective is sought to have a long working distance.

Furthermore, even among the infrared lights, light having a longer wavelength has smaller Rayleigh scattering. Therefore light having a longer wavelength is capable of reaching even deeper position as the excitation light. For this reason, it is preferable that the microscope objective to be used in the multi-photon excitation has a superior imaging performance in the longer wavelength. Furthermore, it is preferable to be able to observe more wide area.

Moreover, in the observation of a deep position of a specimen, an aberration due to a refractive index of the sample cannot be ignored. Therefore, it is preferable that the microscope objective has a means of correcting fluctuation in such aberration.

As a microscope objective which has a large numerical aperture and whose aberrations have been corrected favorably, immersion microscope objectives disclosed in Japanese Patent Applications Laid-open Nos. 2005-189732 and H11-249024, and U.S. Pat. No. 7,782,539 are available.

SUMMARY OF THE INVENTION

An immersion microscope objective according to the present invention comprising, in order from an object side: a first lens group; a second lens group; and a third lens group; wherein the first lens group has a positive refractive power and includes a first cemented lens disposed nearest to the object side in the first lens group, the second lens group includes a second cemented lens, the third lens group includes a lens component that has a positive refractive power and changes a divergent light beam incident from the second lens group to a convergent light beam, two lens components that change the convergent light beam to a divergent light beam, and a lens component that has a positive refractive power and changes the divergent light beam to a parallel light beam and emits the parallel light beam, and the following conditional expressions (1) is satisfied:

$$60 \text{ mm}^2 \leq d_0 \times f \times NA_o \leq 500 \text{ mm}^2 \quad (1)$$

where $d_0$ denotes a working distance of the immersion microscope objective, f denotes a focal length of the immersion microscope objective, $NA_o$ denotes an object-side numerical aperture of the immersion microscope objective, the lens component is a single lens or a cemented lens.

A microscope according to the present invention comprising; a main-body section; and a microscope objective, wherein the immersion microscope objective described above is used for the microscope objective.

DETAILED DESCRIPTION OF THE INVENTION

Figure 1:
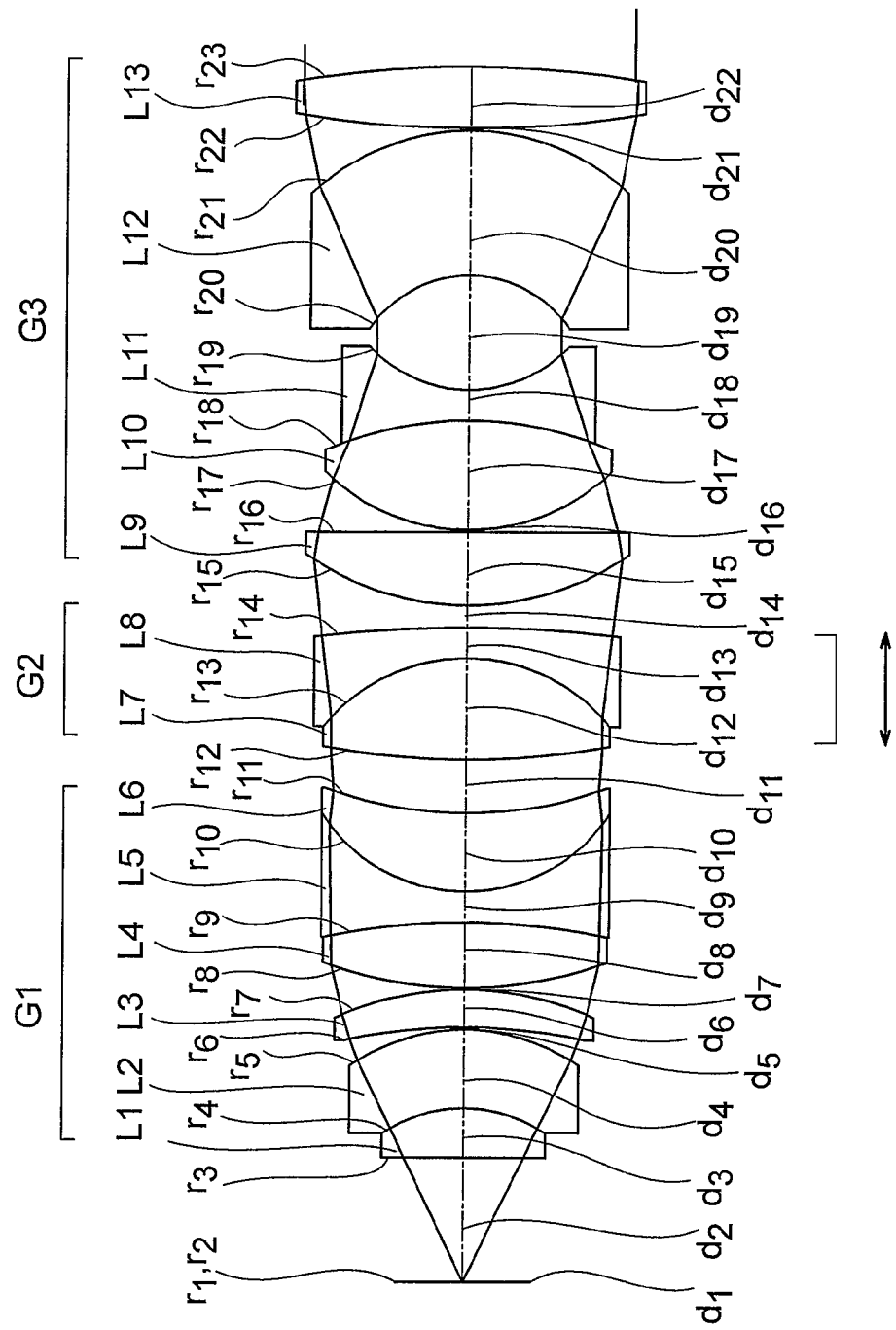
FIG. 1 is a cross-sectional view along an optical axis, showing an optical arrangement of an immersion microscope objective according to an example 1 of the present invention.

An immersion microscope objective (hereinafter, referred to as the "objective" as appropriate) according to an embodiment comprises, in order from an object side, a first lens group, a second lens group, and a third lens group, wherein the first lens group has a positive refractive power, the second lens group includes at least one cemented lens, and the third lens group includes: a lens component which has a positive refractive power and changes a divergent light beam incident from the second lens group to a convergent light beam; two lens components which change the convergent light beam to a divergent light beam; and a lens component which has a positive refractive power and changes the divergent light beam to a parallel light beam and emits the parallel light beam.

It should be noted that the objective may be configured as follows. A first cemented lens is disposed in the first lens group, nearest to the object side. The cemented lens in the second lens group is a second cemented lens, and the second lens group consists of the second cemented lens. The lens component refers to a single lens or a cemented lens. The object side means a sample side.

If an object-side numerical aperture (hereinafter, simply referred to as the "numerical aperture") of the objective is made large, it is possible to make light with a larger angle of divergence (diffraction angle) incident on the objective from the sample. As a result, it is possible to observe a microscopic structure of the sample further minutely. Light with a large angle of divergence, however, has a high light-ray height in the first lens group. When such a light ray is bent sharply in the first lens group, high order aberration is liable to occur in the first lens group.

Therefore, in the objective according to the present embodiment, the first lens group is configured to have a positive refractive power, to thereby cause the light ray with a large angle of divergence to be bent gradually through the first lens group. It should be noted that the first lens group does not necessarily change a divergent light beam to a convergent light beam. The above configuration suppresses the occurrence of large high order aberration, and also changes the light beam from the object to a light beam with a small angle of divergence.

The second lens group includes at least one cemented lens. By including the cemented lens, it is possible to suppress the occurrence of aberration (in particular, chromatic aberration) in the second lens group as much as possible. It should be noted that the second lens group may be made up of one cemented lens alone. With this configuration, it is possible to prevent the total length of the objective from becoming long, while favorably correcting the aberration.

Further, as the second lens group includes the cemented lens, even in a case where the second lens group is moved along the optical axis, fluctuation (deterioration) in aberration caused by the movement of the second lens group can be minimized.

In the first lens group, it is important not to generate large high order aberration. Thus, the first lens group does not necessarily change the divergent light beam to a convergent light beam. The second lens group is also configured to suppress the occurrence of aberration in the second lens group as much as possible. Thus, the second lens group does not necessarily change the divergent light beam to a convergent light beam, either.

Accordingly, the light beam incident on the third lens group is not necessarily a convergent light beam. Thus, in the third lens group, the divergent light beam is once made to converge, and then, the converging light beam is made to diverge. To this end, the third lens group includes, in order from the object side, the lens component having a positive refractive power, the two lens components, and the lens component having a positive refractive power.

In the lens component having a positive refractive power disposed on the object side, the divergent light beam incident from the second lens group is converted to a convergent light beam. This convergent light beam enters the two lens components, where the convergent light beam is converted to a divergent light beam. This divergent light beam enters the lens component having a positive refractive power disposed on the image side. In this lens component, the divergent light beam is converted to a parallel light beam. As a result, from the lens component having a positive refractive power disposed on the image side, a parallel light beam emerges. It should be noted that the light beam exiting the lens component having a positive refractive power disposed on the image side does not necessarily have to be completely parallel; it may be substantially parallel.

The third lens group configured as described above can sufficiently correct the Petzval's sum. It is desirable that a convergent light beam is converted to a divergent light beam within the third lens group, i.e., before the light beam exits the third lens group.

In the objective of the present embodiment, the following conditional expression (1) is satisfied:

$$60 \text{ mm}^2 \leq d_0 \times f \times NA_o \leq 500 \text{ mm}^2 \tag{1}$$

where $d_0$ denotes a working distance of the immersion microscope objective, f denotes a focal length of the immersion microscope objective, $NA_o$ denotes an object-side numerical aperture of the immersion microscope objective.

Further, in the objective of the present embodiment, it is more preferable that the following conditional expression (2) is satisfied:

$$0.15 \leq d_0 \times f/(|r_1| \times L) \leq 10 \tag{2}$$

where $r_1$ is a radius of curvature of a cemented surface of the first cemented lens, and L denotes a distance on an optical axis from a sample plane to a lens surface nearest to the image side in the immersion microscope objective.

The conditional expression (1) is a conditional expression that defines the working distance, the focal length, and the object-side numerical aperture (hereinafter, referred to as the "numerical aperture" as appropriate) of the objective. When the conditional expression (1) is satisfied, an appropriately long focal length and a sufficiently long working distance are obtained, so it is possible to observe a wider area of a sample and it is also possible to observe a deeper portion of the sample with high resolving power. These advantages are particularly noticeable in fluorescence observation by two-photon excitation.

When falling below the lower limit of the conditional expression (1), since the focal length will become short, and it will become difficult to secure a sufficiently long working distance, it will become difficult to observe a wider area or observe a deeper portion of the sample. Further, the numerical aperture cannot be made large, and thus, it will become difficult to observe the sample with high resolving power.

When exceeding the upper limit of the conditional expression (1), the numerical aperture will become excessively large. In this case, since the height of the light ray passing through the lenses will become high, an amount of aberration that occurs will become large. In order to observe a sample with high resolving power, further aberration correction is required, but such aberration correction will become difficult.

The conditional expression (2) is a conditional expression that defines the working distance of the objective, the focal length of the objective, the radius of curvature of the cemented surface of the first cemented lens, and the total length of the objective. When the conditional expression (2) is satisfied, the Petzval's sum and the high order aberration occurring in the first cemented lens can be corrected in a well-balanced manner. It should be noted that the total length of the objective refers to a distance on the optical axis from the sample plane to the lens surface, in the objective, that is nearest to the image side.

When falling below the lower limit of the conditional expression (2), the light-ray height will become high at the image-side portion of the first cemented lens. This makes it difficult to favorably correct the high order aberration in the lens system located closer to the image side than the first cemented lens.

When exceeding the upper limit of the conditional expression (2), the light-ray height will become low at the image-side portion of the first cemented lens. This makes it difficult to sufficiently correct the Petzval's sum in the lens system located closer to the image side than the first cemented lens.

Further, in the observation of a biological sample, not only the surface of the sample, but also the interior of the sample may be observed. In this case, L denotes a distance on the optical axis from the position being observed (i.e. the in-focus position) to the lens surface nearest to the image side in the immersion microscope objective.

Here, it is preferable that the following conditional expression (1') is satisfied instead of the conditional expression (1).

$$60 \text{ mm}^2 \leq d_0 \times f \times NA_o \leq 450 \text{ mm}^2 \tag{1'}$$

Further, it is more preferable that the following conditional expression (1") is satisfied instead of the conditional expression (1).

$$65 \text{ mm}^2 \leq d_0 \times f \times NA_o \leq 400 \text{ mm}^2 \tag{1"}$$

Here, it is preferable that the following conditional expression (2') is satisfied instead of the conditional expression (2).

$$0.15 \leq d_0 \times f/(|r_1| \times L) \leq 1 \tag{2'}$$

Further, it is more preferable that the following conditional expression (2") is satisfied instead of the conditional expression (2).

$$0.17 \leq d_0 \times f/(|r_1| \times L) \leq 0.8 \tag{2"}$$

As described above, according to the objective of the present embodiment, it is possible to observe a wide area, and it is also possible to observe a deeper portion of the sample with high resolving power.

Further, in the objective according to the present embodiment, it is preferable that the two lens components in the third lens group include a third cemented lens having a concave surface facing the image side and a lens component having a concave surface facing the object side, that the lens component having the concave surface facing the object side is disposed opposed to the third cemented lens, and the following conditional expression (3) is satisfied:

$$0.01 \leq d_0 \times d_3/L^2 \leq 0.15 \tag{3}$$

where $d_0$ denotes the working distance of the immersion microscope objective, $d_3$ denotes a thickness on the optical axis of the lens component having the concave surface facing the object side, L denotes the distance on the optical axis from the sample plane to the lens surface nearest to the image side in the immersion microscope objective, and the lens component is a single lens or a cemented lens.

The conditional expression (3) is a conditional expression that defines the working distance of the objective, the thickness of a lens component in the third lens group, and the total length of the objective. When the conditional expression (3) is satisfied, it is possible to observe a wider area of a sample from its center to the periphery, with high resolving power and with high brightness and high contrast, while making the objective compact in size. These advantages are particularly noticeable in fluorescence observation by two-photon excitation.

When falling below the lower limit of the conditional expression (3), it will not be possible to secure a sufficiently long working distance and it will also be difficult to sufficiently secure the flatness of field over a wider area of the real field. Further, since a outside diameter of the objective will become large, it difficult to make the objective compact in size.

When exceeding the upper limit of the conditional expression (3), the working distance will become excessively long. In this case, since the height of the light ray passing through the lenses will become high, an amount of aberration that occurs will become large. In order to observe a wider area of a sample from its center to its periphery, with high resolving power and with high brightness and high contrast, further aberration correction is required, but such aberration correction will become difficult.

Here, it is preferable that the following conditional expression (3') is satisfied instead of the conditional expression (3).

$$0.011 \leq d_0 \times d_3/L^2 \leq 0.12 \quad (3')$$

Further, it is more preferable that the following conditional expression (3") is satisfied instead of the conditional expression (3).

$$0.013 \leq d_0 \times d_3/L^2 \leq 0.1 \quad (3'')$$

Further, it is preferable that the objective according to the present embodiment includes a moving lens group that moves along the optical axis, and the following conditional expression (4) is satisfied:

$$0.004 \leq (nd_{01} \times d_{01} - nd_{02} \times d_{02}) \times f/L^2 \leq 0.03 \quad (4)$$

where $nd_{01}$ denotes a maximum refractive index of refractive indices of a plurality of immersion liquids, for a d-line, $d_{01}$ denotes a working distance during use of the immersion liquid with $nd_{01}$, $nd_{02}$ denotes a minimum refractive index of the refractive indices of the plurality of immersion liquids, for the d-line, $d_{02}$ denotes a working distance during use of the immersion liquid with $nd_{02}$, f denotes the focal length of the immersion microscope objective, and L denotes the distance on the optical axis from the sample plane to the lens surface nearest to the image side in the immersion microscope objective.

Sample observation is carried out using different types of immersion liquids. During the observations, since the optical path length from a surface of the sample to the objective, or the optical path length from a cover glass to the objective, varies, an aberration will occur (fluctuate). In view of the foregoing, the objective according to the present embodiment includes the moving lens group which moves along the optical axis. This can suppress the occurrence (fluctuation) of aberration. As a result, it is possible to maintain a favorable imaging performance even if the type of the immersion liquid used is changed.

The conditional expression (4) is a conditional expression that defines the optical path length difference from the sample plane to the objective, the focal length of the objective, and the total length of the objective. When the conditional expression (4) is satisfied, the types of immersion liquids that can be used increase, for example. That is, even if the refractive index of the immersion liquid is changed, a favorable imaging performance can be maintained. It is therefore possible to maintain a favorable imaging performance for a variety of types of immersion liquids.

The optical path length also varies depending on the observation position (in-focus position). For example, in the case of a biological sample, there are various tissues in a living body, and different tissues have different refractive indices. Therefore, the optical path lengths vary depending on the types of the tissues present in the depth direction. Even in such a case, when there is the moving lens group which moves along the optical axis and when the conditional expression (4) is satisfied, then a favorable imaging performance can be maintained over a wide range in the depth direction.

When falling below the lower limit of the conditional expression (4), the optical path length difference will become excessively small. In this case, the types of immersion liquids which can be used are limited. Further, the range in which a favorable imaging performance can be maintained becomes narrower in the depth direction of the sample. This leads to a narrower observation range in the depth direction of the sample.

When exceeding the upper limit of the conditional expression (4), the optical path length difference will become excessively large. Such a large optical path length difference can widen an observation range in the depth direction of the sample. In the deep observation position, however, since the amount of aberration increases, it is difficult to perform aberration correction in the deep observation position even if the lens group is moved. It is thus difficult to implement a sufficient imaging performance in the deep position.

Here, it is preferable that the following conditional expression (4') is preferably satisfied instead of the conditional expression (4).

$$0.006 \leq (nd_{01} \times d_{01} - nd_{02} \times d_{02}) \times f/L^2 \leq 0.025 \quad (4')$$

Further, it is more preferable that the following conditional expression (4") is satisfied instead of the conditional expression (4).

$$0.008 \leq (nd_{01} \times d_{01} - nd_{02} \times d_{02}) \times f/L^2 \leq 0.02 \quad (4'')$$

Further, in the objective according to the present embodiment, it is preferable that the moving lens group is the second lens group, and that the second lens group moves along the optical axis between the first lens group and the third lens group.

In the first lens group, a light beam incident from the object, having a large angle of divergence, is changed to a light beam having a small angle of divergence. Therefore, the light beam incident on the second lens group is a light beam having a small angle of divergence. Thus, using the second lens group as the moving lens group can minimize the fluctuation (deterioration) in aberration caused by the movement of the lens group.

Further, in the objective according to the present embodiment, the following conditional expression (5) is preferably satisfied:

$$0.9 < |\alpha/\beta| < 1.1 \quad (5)$$

where $\alpha$ denotes an angle between a prescribed principal ray incident on the second lens group and the optical axis, $\beta$ denotes an angle between the prescribed principal ray exiting the second lens group and the optical axis, and the prescribed principal ray is a principal ray that has a largest angle with the optical axis at a pupil position.

The conditional expression (5) is a conditional expression that defines the range in absolute value of the magnification of the second lens group. When the conditional expression (5) is satisfied, the paraxial image-forming position hardly changes even if the second lens group is moved. This makes it possible to relatively easily perform the aberration correction by moving the second lens group. To move the second lens group, a correction collar may be rotated, for example.

When falling below the lower limit of the conditional expression (5) or exceeding the upper limit of the conditional expression (5), since the magnification will vary because of the movement of the second lens group, it is difficult to suppress the change of the paraxial image-forming position (in-focus position).

Figure 18:
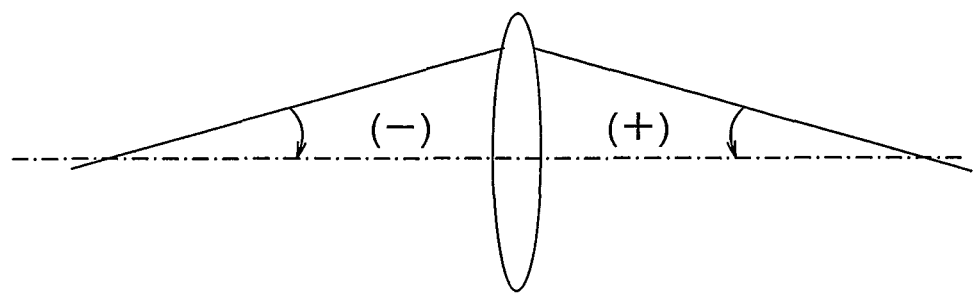
FIG. 18 is a diagram illustrating positive and negative angles.

It should be noted that, as shown in FIG. 18, positive and negative angles are defined as follows. When a light ray is to be aligned with the optical axis, if the light ray is rotated clockwise, the angle between the ray and the optical axis will be negative; if the light ray is rotated counterclockwise, the angle therebetween will be positive.

Here, it is preferable that the following conditional expression (5') is satisfied instead of the conditional expression (5).

$$0.92 \leq |\alpha/\beta| \leq 1.07 \qquad (5')$$

Further, it is more preferable that the following conditional expression (5") is satisfied instead of the conditional expression (5).

$$0.94 \leq |\alpha/\beta| \leq 1.03 \qquad (5'')$$

Further, in the objective according to the present embodiment, it is preferable that the first cemented lens is disposed nearest to the object side in the first lens group, the first cemented lens includes an object-side lens and an image-side lens, and the following conditional expression (6) is satisfied:

$$0.3 \leq nd_2 - nd_1 \leq 0.7 \qquad (6)$$

where $nd_1$ denotes a refractive index of the object-side lens for the d-line, and $nd_2$ denotes a refractive index of the image-side lens for the d-line.

Further, the objective according to the present embodiment may be configured to include, in order from an object side: a first lens group; a second lens group; and a third lens group; wherein the first lens group has a positive refractive power, the second lens group includes at least one cemented lens, the third lens group includes a lens component that changes a divergent light beam incident from the second lens group to a convergent light beam, a plurality of lens components that change the convergent light beam to a divergent light beam, and a lens component that changes the divergent light beam to a parallel light beam and emits the parallel light beam.

Then, it is desirable that the following conditional expression (1-1) is satisfied:

$$60 \text{ mm}^2 \leq d_0 \times f \times NA_o \qquad (1\text{-}1)$$

where $d_0$ denotes a working distance of the immersion microscope objective, f denotes a focal length of the immersion microscope objective, $NA_o$ denotes an object-side numerical aperture of the immersion microscope objective, and the lens component is a single lens or a cemented lens.

The conditional expression (1-1) has the same technical meaning as that of the conditional expression (1).

Further, in the objective according to the present embodiment, it is preferable that chromatic aberration is corrected at least in a wavelength region from 700 nm to 1300 nm.

This configuration ensures that an observation using light in the infrared wavelength region can be performed with high resolving power.

Further, in the objective according to the present embodiment, the working distance is desirably 7 mm or longer, and the object-side numerical aperture is desirably 0.5 or greater. Further, the focal length of the immersion microscope objective at the time when the objective is combined with a tube lens is desirably 18 mm or longer.

A microscope according to the present embodiment includes: a scanner section; a main-body section, and a microscope objective, wherein one of the above-described immersion microscope objectives is used for the microscope objective.

With this configuration, it is possible to implement a microscope which enables observation over a wider area of a sample and also enables observation of a deeper portion of the sample with high resolving power.

It should be noted that each of the conditional expressions may be used independently, or may be used freely in combination with any other conditional expressions. In either case, the effects of the present invention are achieved. Further, the upper limit or the lower limit of any conditional expression may be changed independently. The resultant conditional expression will achieve the effects of the present invention similarly.

Examples of the immersion microscope objective according to the present invention will be described in detail below by referring to the accompanying drawings. It should be noted that the present invention is not limited to the following examples.

Figure 2:
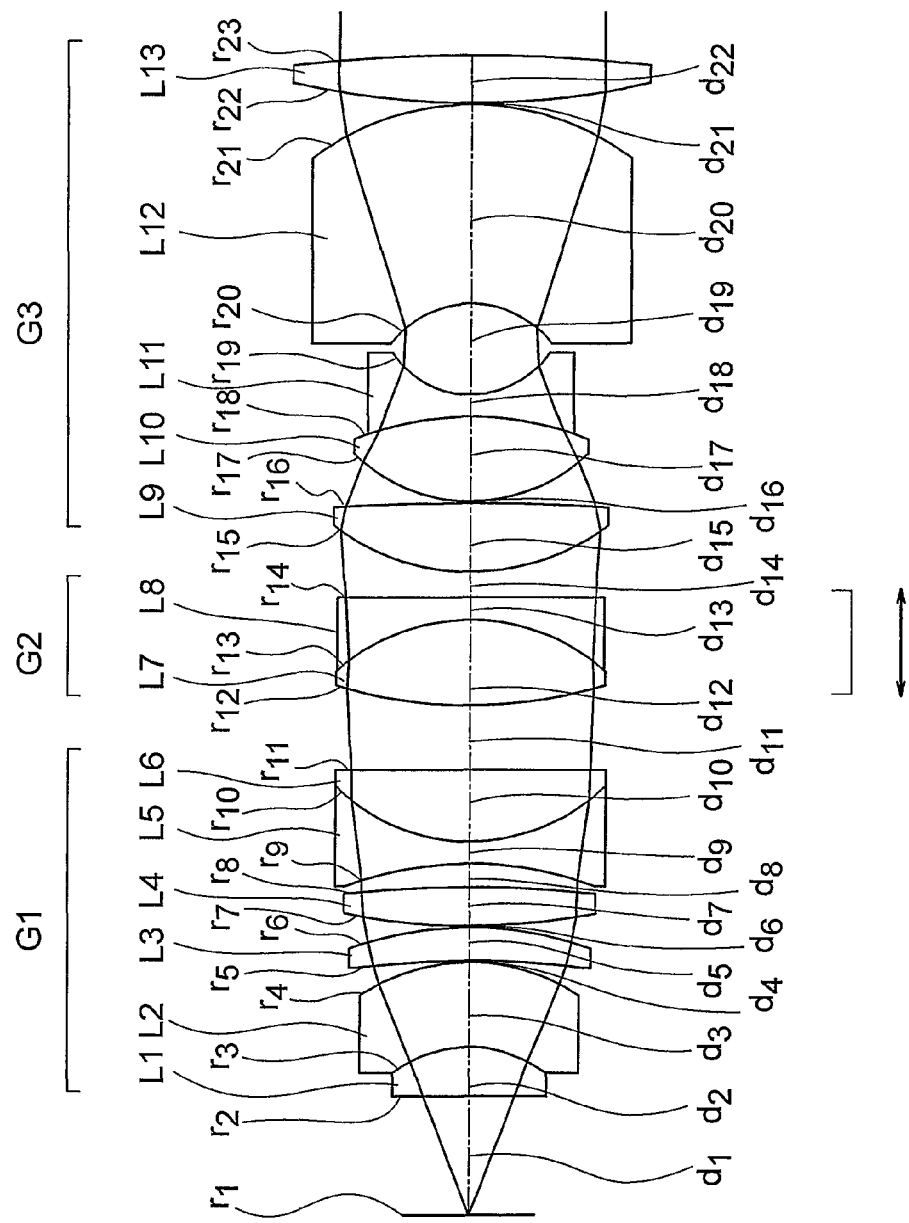
FIG. 2 is a cross-sectional view along an optical axis, showing an optical arrangement of an immersion microscope objective according to an example 2 of the present invention.
Figure 3:
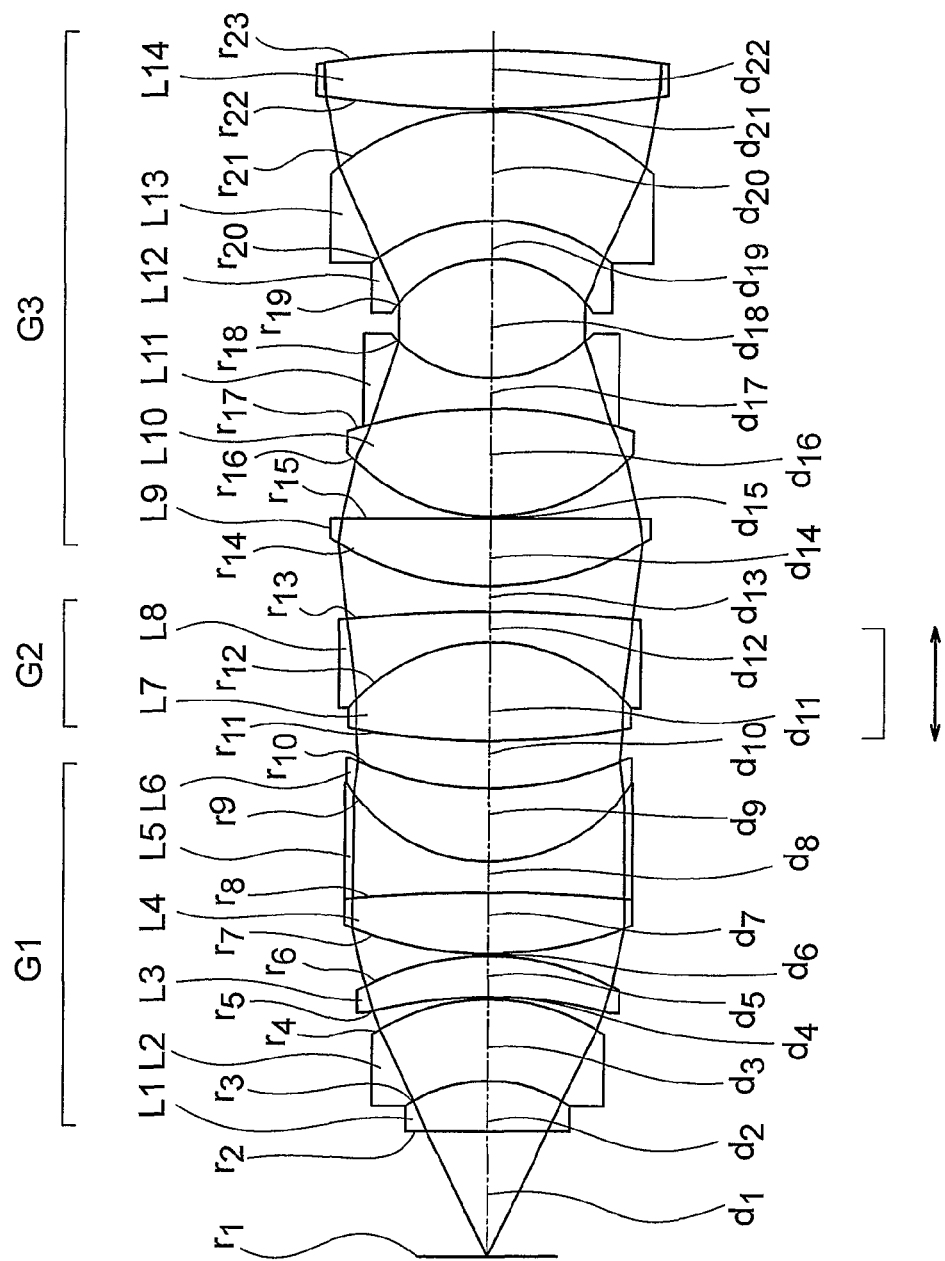
FIG. 3 is a cross-sectional view along an optical axis, showing an optical arrangement of an immersion microscope objective according to an example 3 of the present invention.
Figure 4:
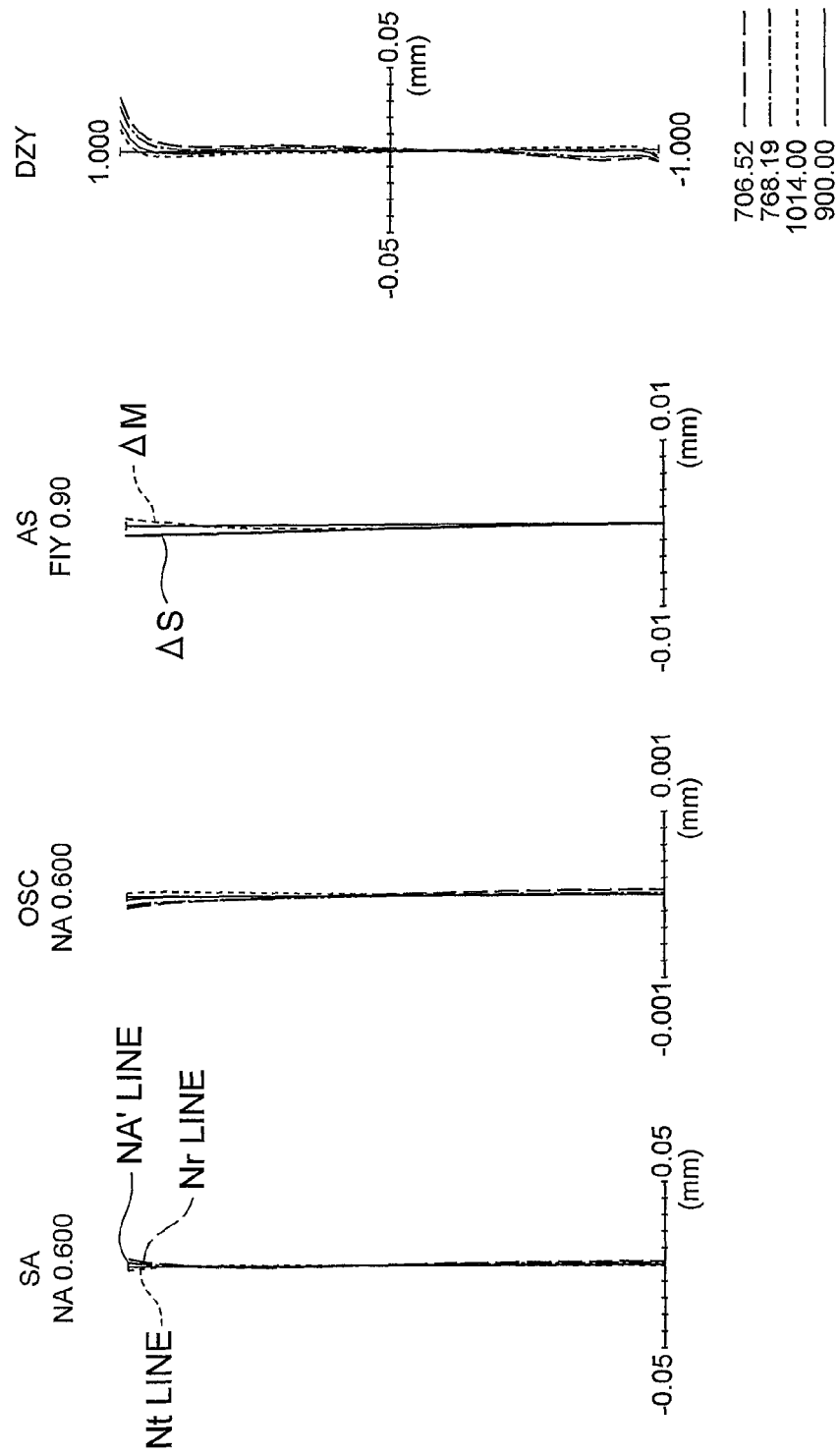
FIGS. 4A, 4B, 4C, and 4D are aberration diagrams of the immersion microscope objective according to the example 1, illustrating the aberrations in a state 1.
Figure 5:
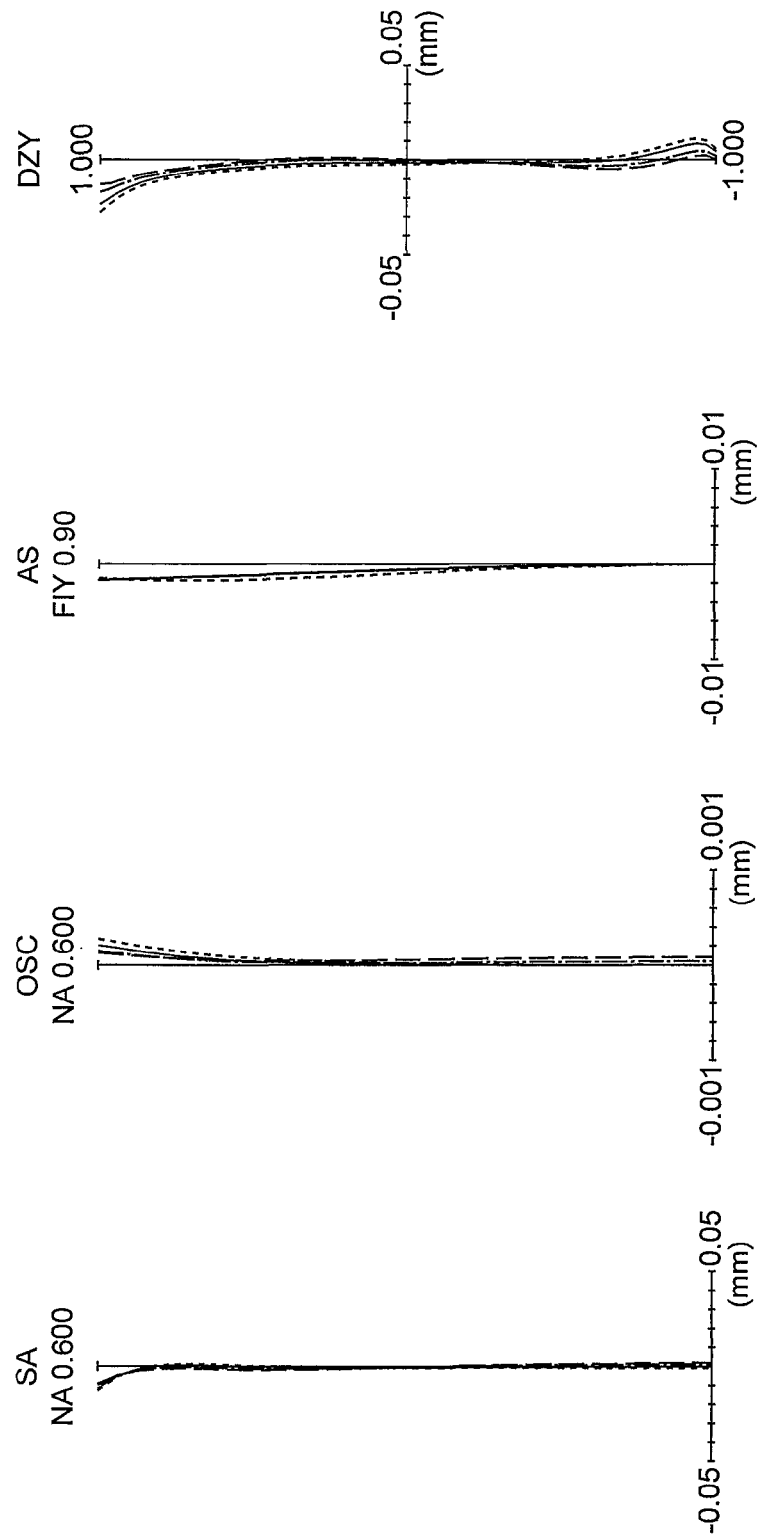
FIGS. 5A, 5B, 5C, and 5D are aberration diagrams of the immersion microscope objective according to the example 1, illustrating the aberrations in a state 2.
Figure 6:
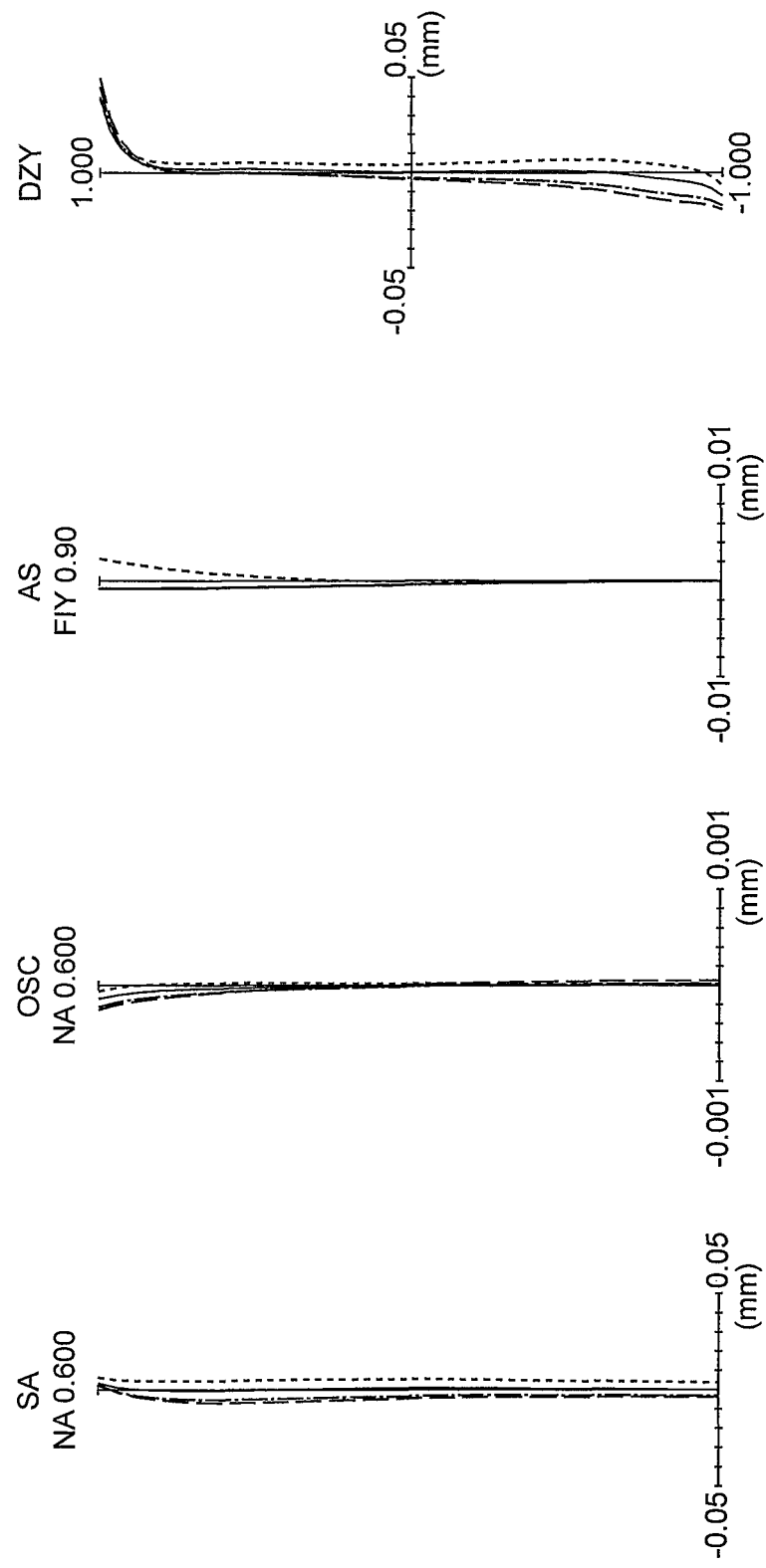
FIGS. 6A, 6B, 6C, and 6D are aberration diagrams of the immersion microscope objective according to the example 1, illustrating the aberrations in a state 3.
Figure 7:
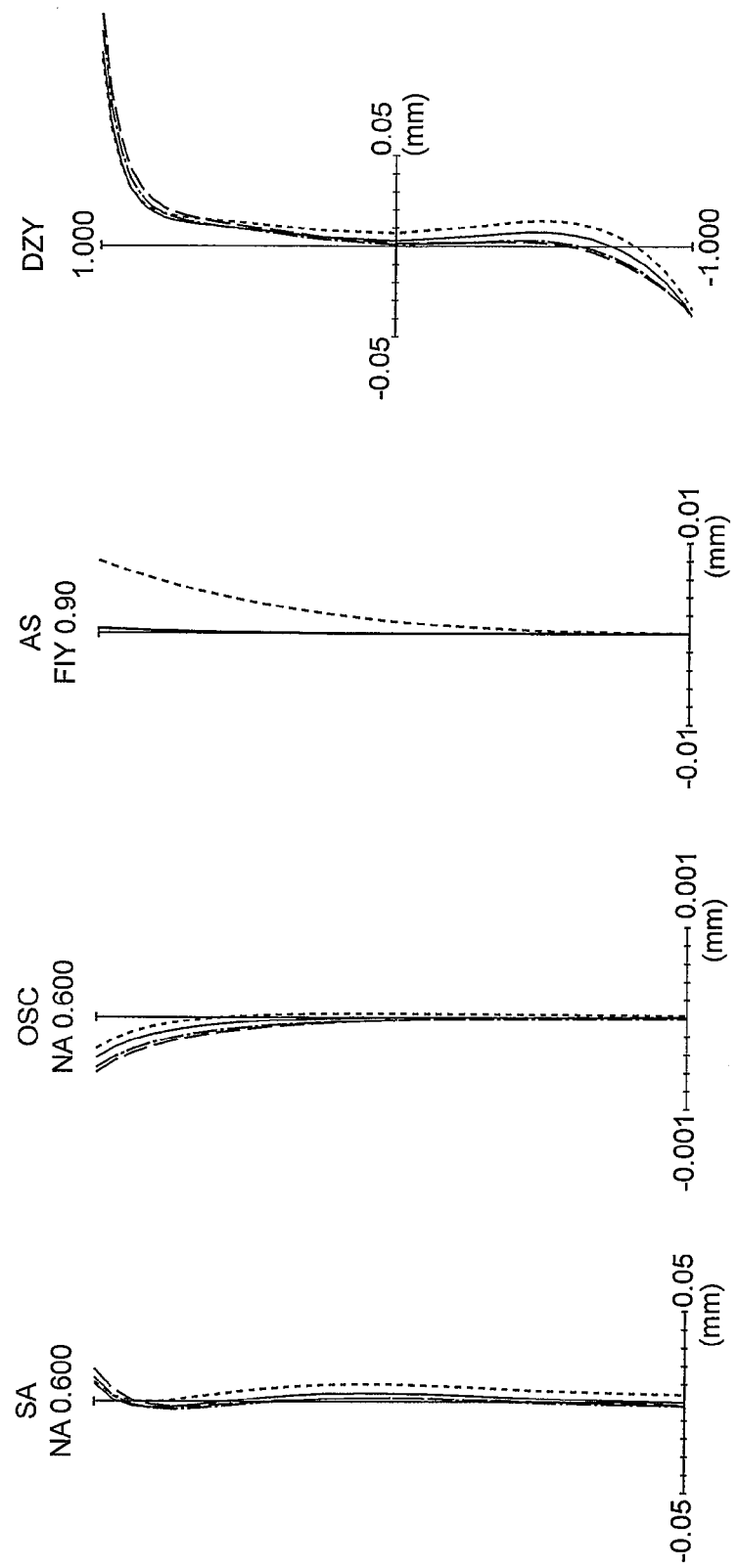
FIGS. 7A, 7B, 7C, and 7D are aberration diagrams of the immersion microscope objective according to the example 1, illustrating the aberrations in a state 4.
Figure 8:
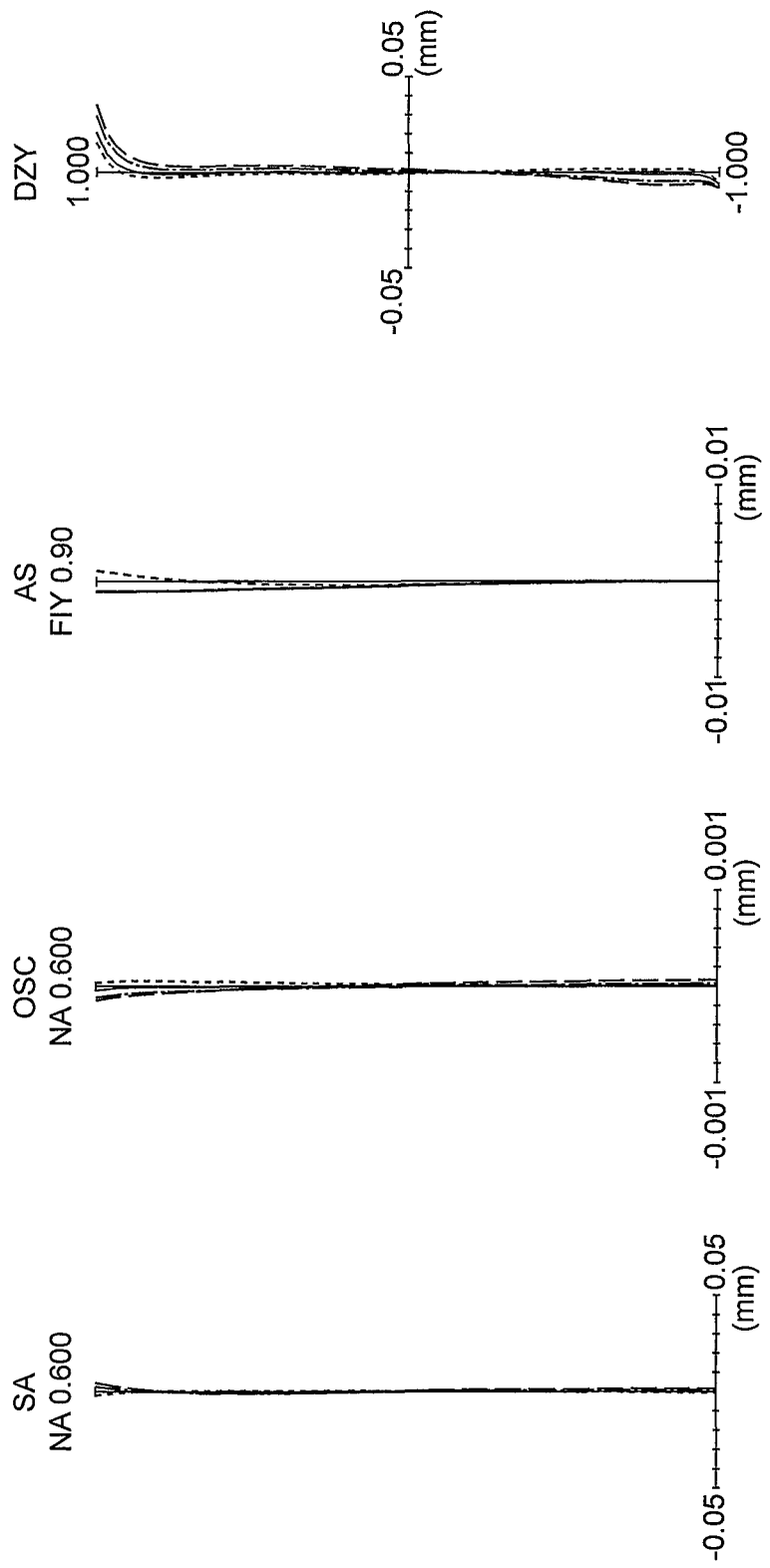
FIGS. 8A, 8B, 8C, and 8D are aberration diagrams of the immersion microscope objective according to the example 1, illustrating the aberrations in a state 5.
Figure 9:
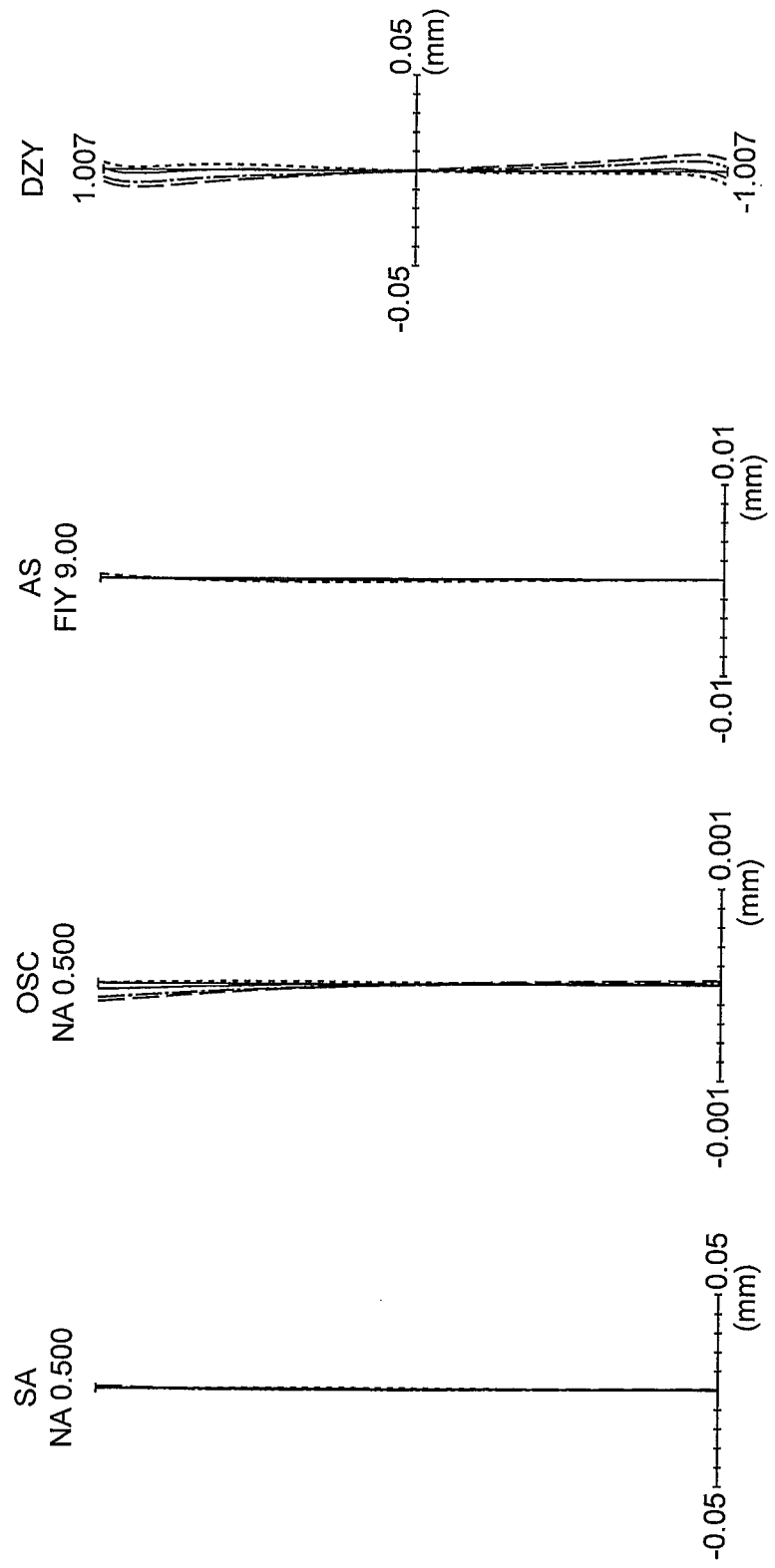
FIGS. 9A, 9B, 9C, and 9D are aberration diagrams of the immersion microscope objective according to the example 2, illustrating the aberrations in the state 1.
Figure 10:
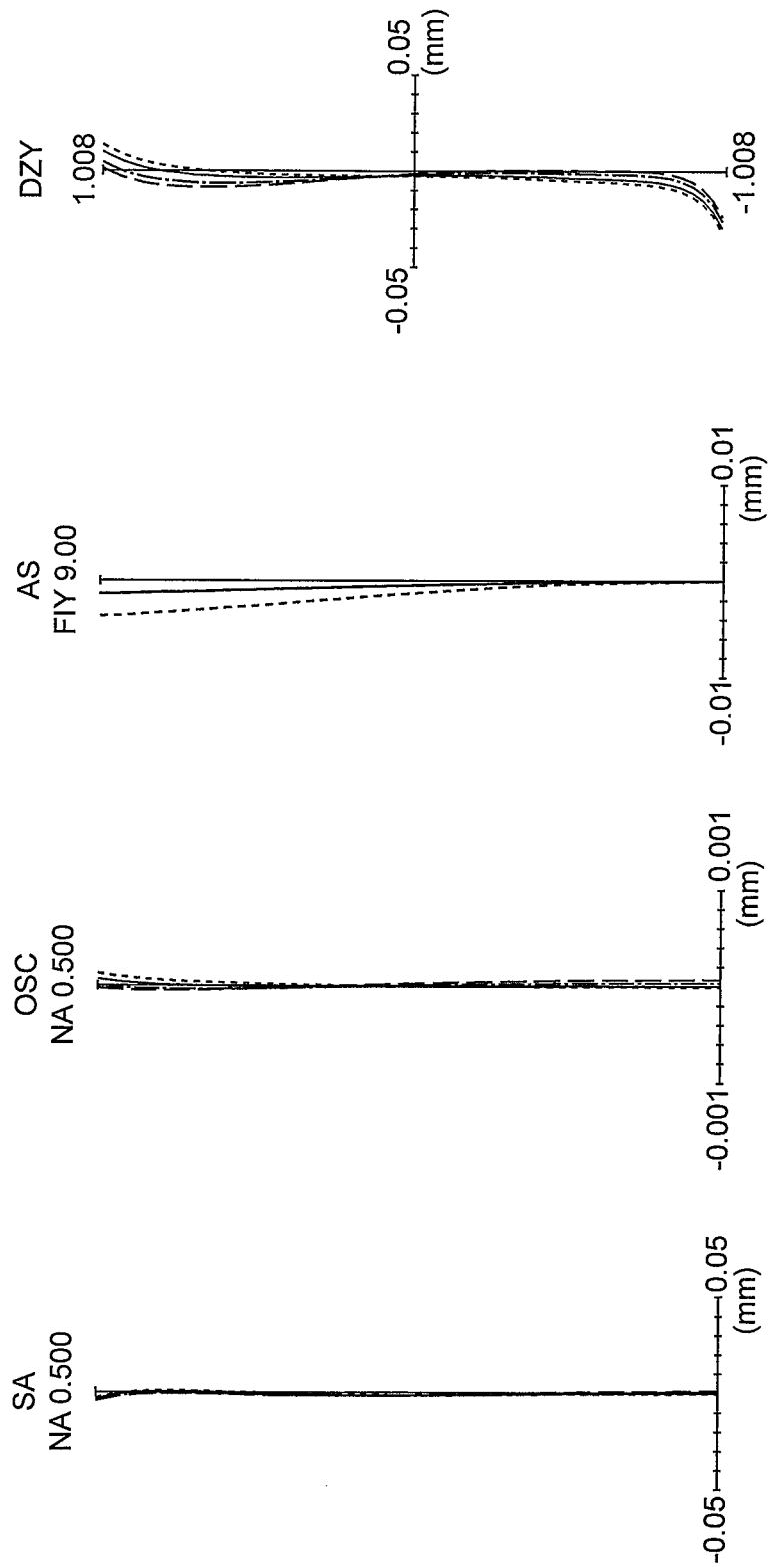
FIGS. 10A, 10B, 10C, and 10D are aberration diagrams of the immersion microscope objective according to the example 2, illustrating the aberrations in the state 2.
Figure 11:
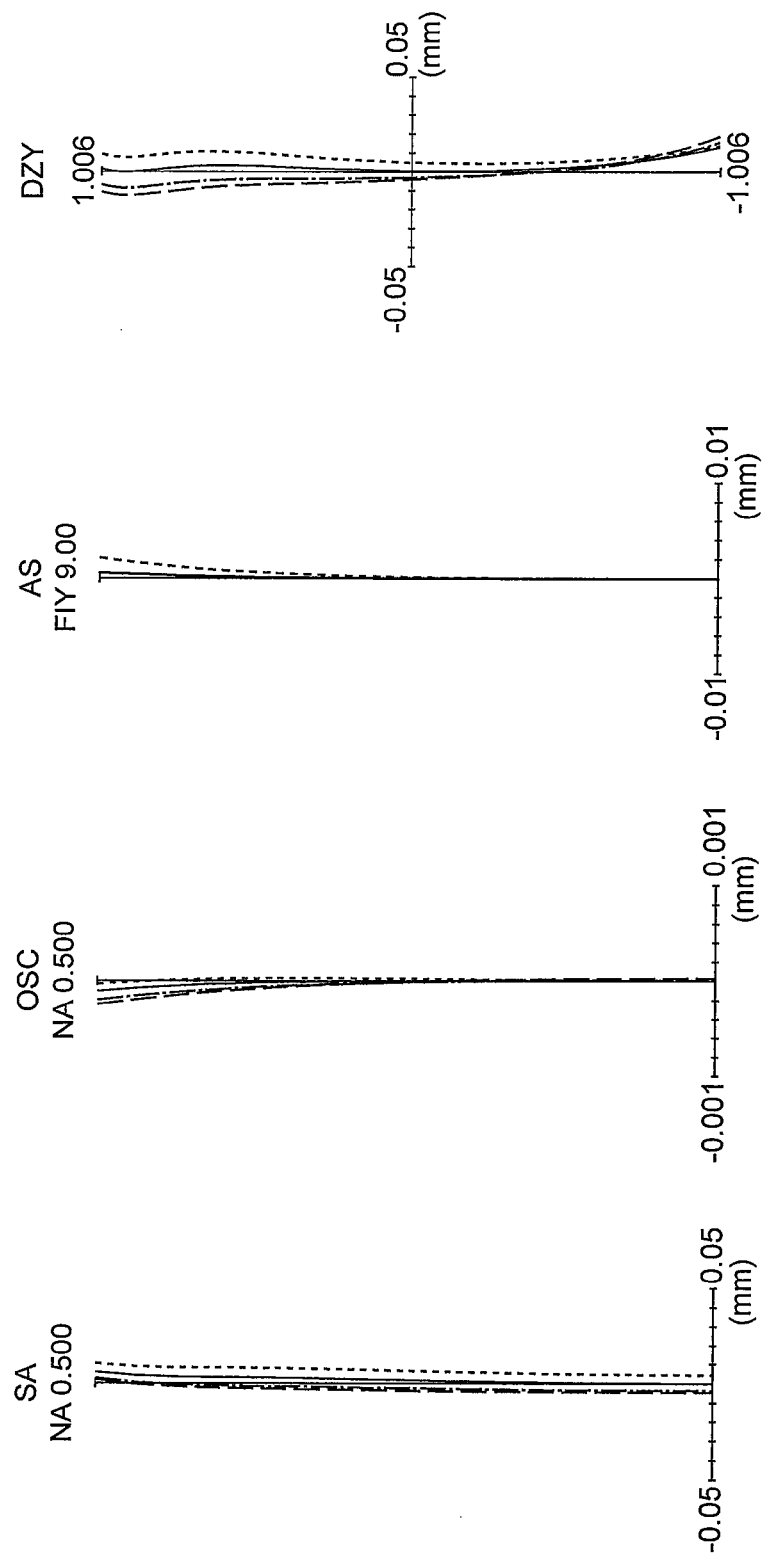
FIGS. 11A, 11B, 11C, and 11D are aberration diagrams of the immersion microscope objective according to the example 2, illustrating the aberrations in the state 3.
Figure 12:
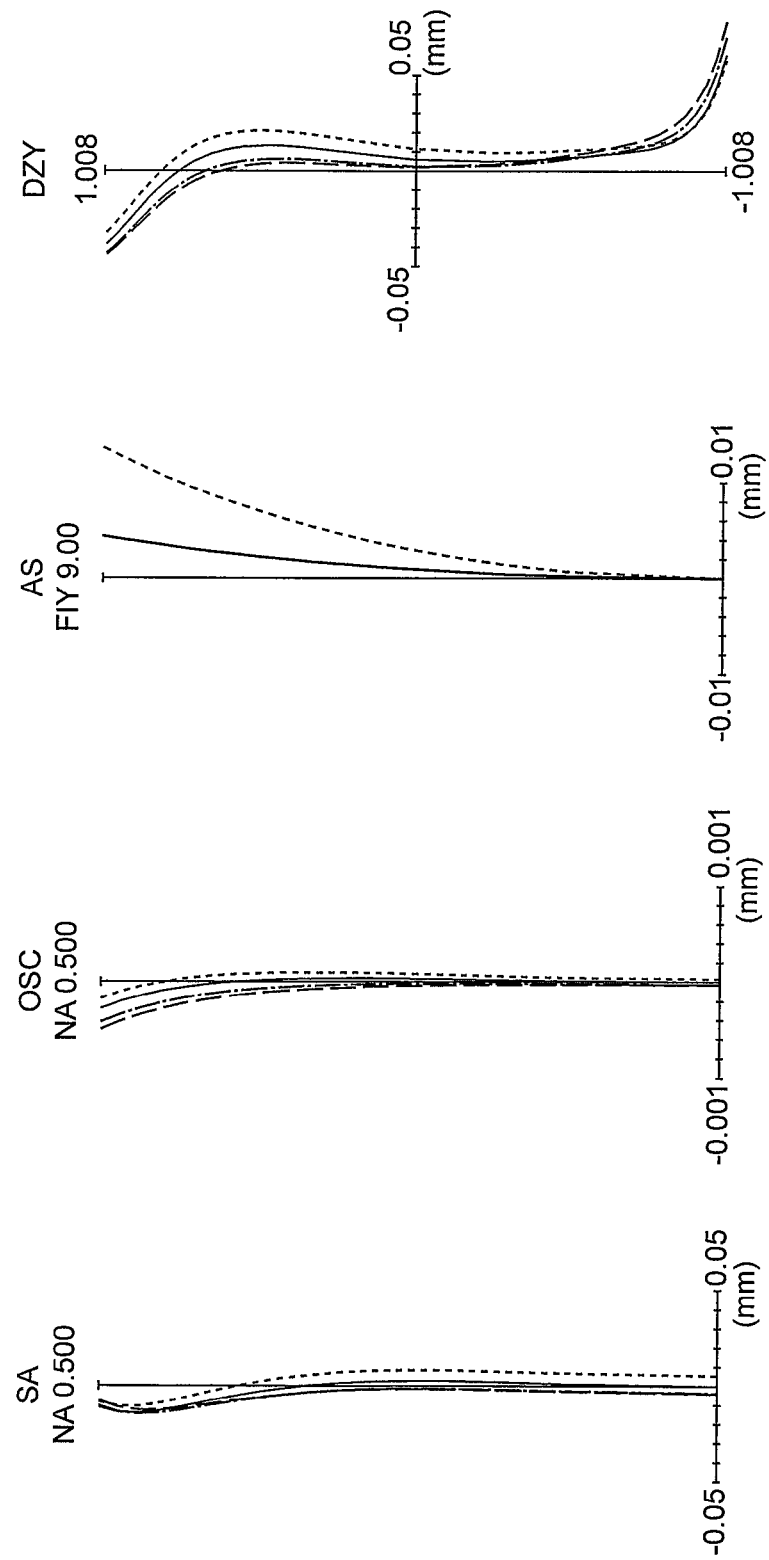
FIGS. 12A, 12B, 12C, and 12D are aberration diagrams of the immersion microscope objective according to the example 2, illustrating the aberrations in the state 4.
Figure 13:
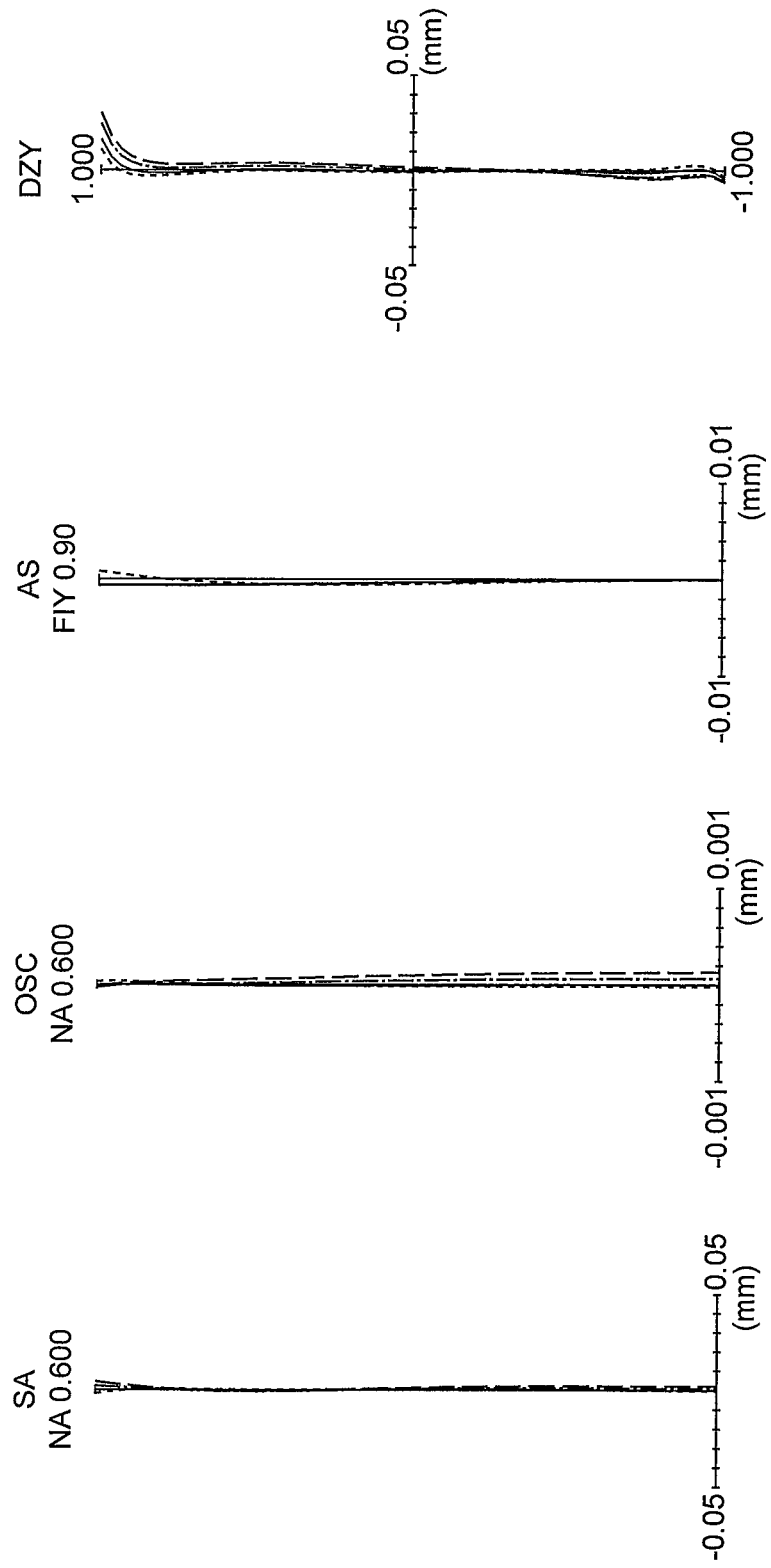
FIGS. 13A, 13B, 13C, and 13D are aberration diagrams of the immersion microscope objective according to the example 3, illustrating the aberrations in the state 1.
Figure 14:
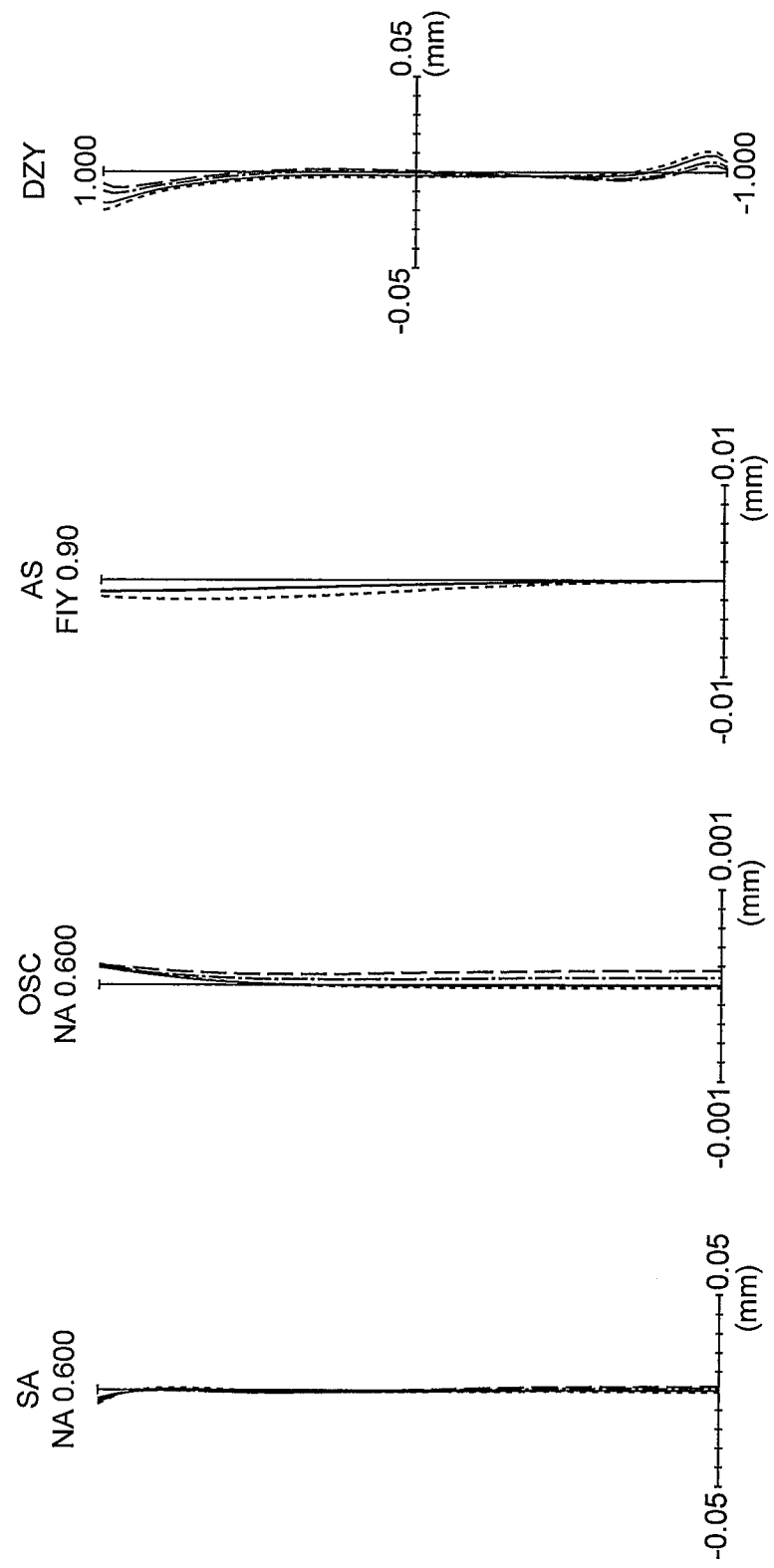
FIGS. 14A, 14B, 14C, and 14D are aberration diagrams of the immersion microscope objective according to the example 3, illustrating the aberrations in the state 2.
Figure 15:
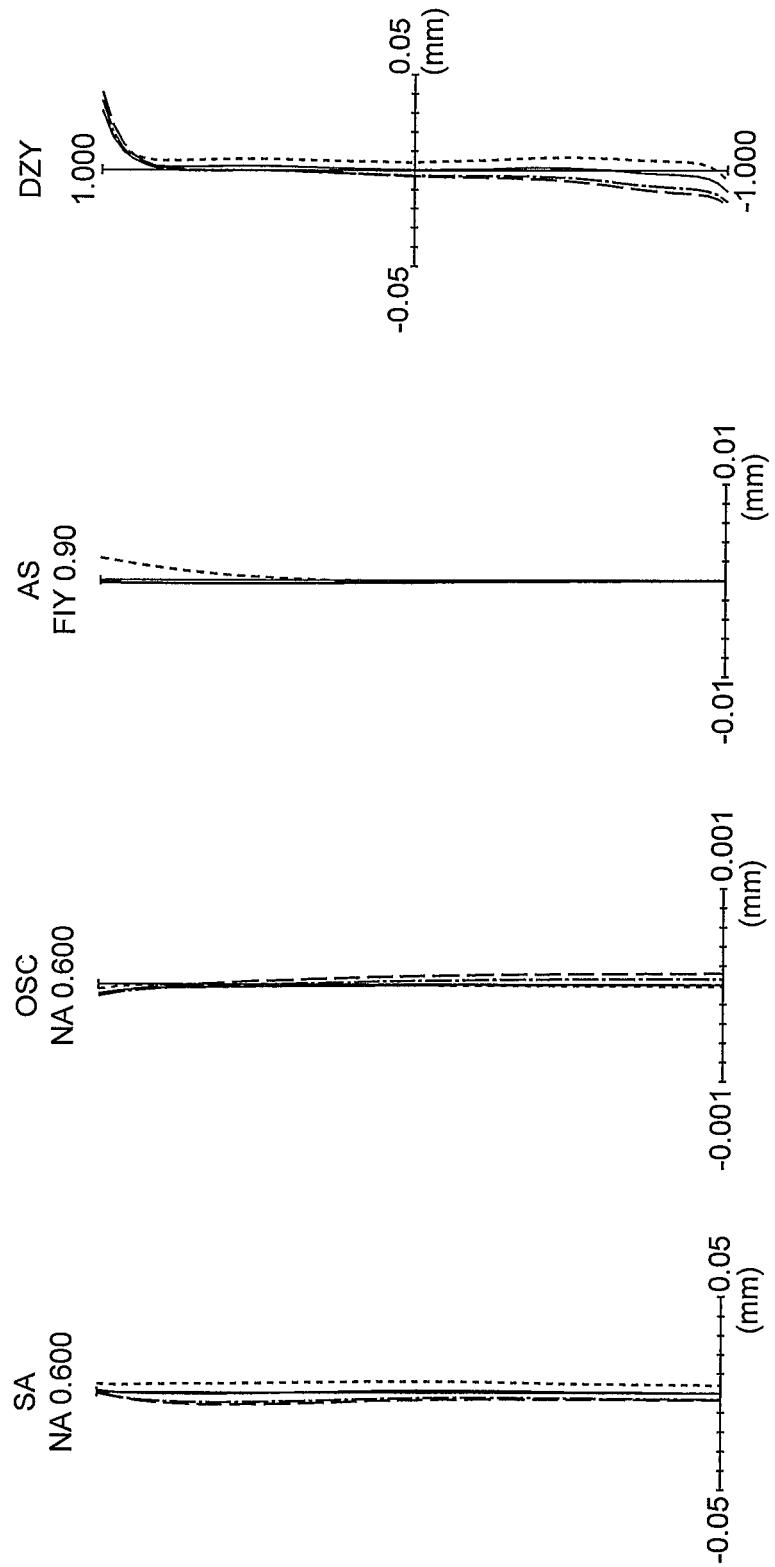
FIGS. 15A, 15B, 15C, and 15D are aberration diagrams of the immersion microscope objective according to the example 3, illustrating the aberrations in the state 3.
Figure 16:
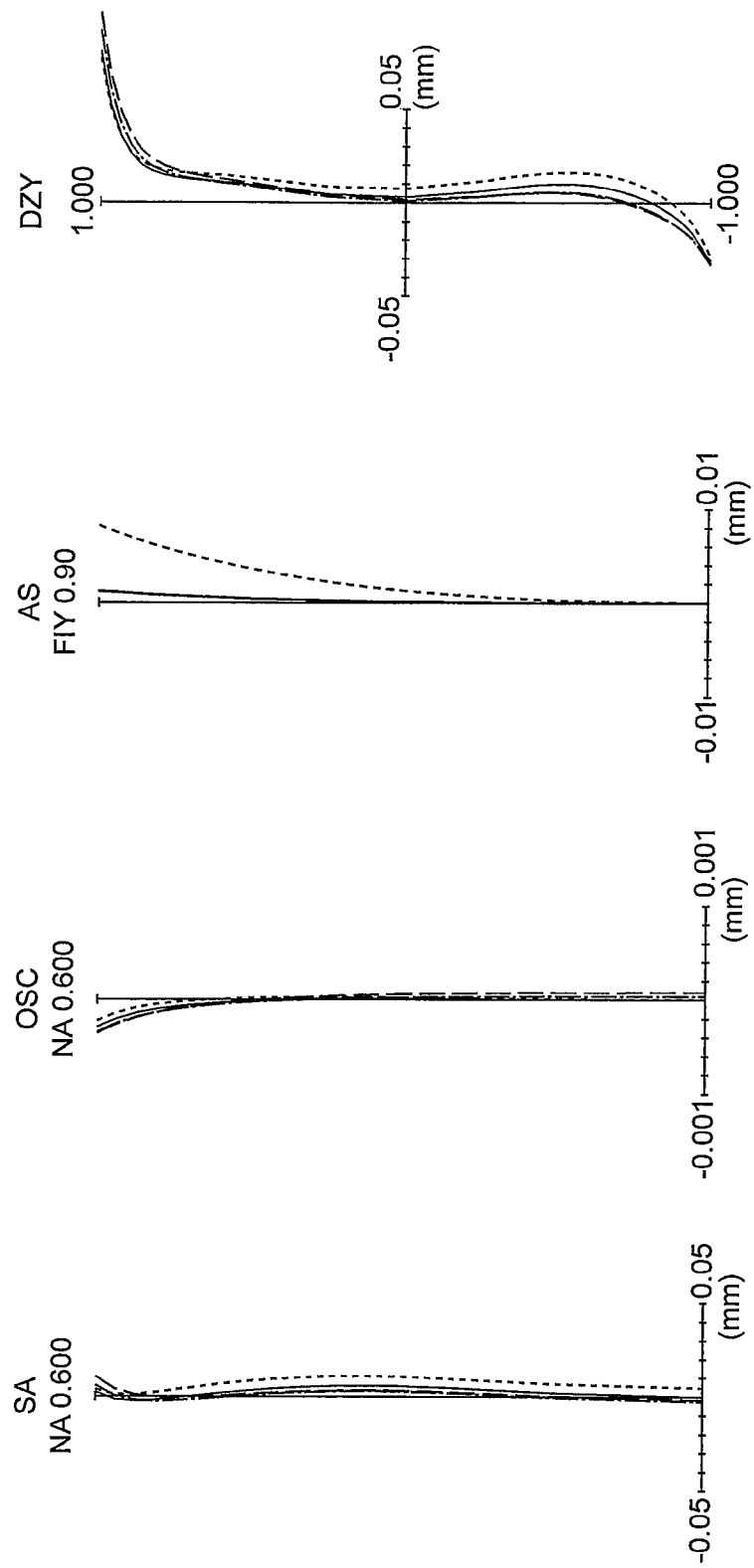
FIGS. 16A, 16B, 16C, and 16D are aberration diagrams of the immersion microscope objective according to the example 3, illustrating the aberrations in the state 4.
Figure 17:
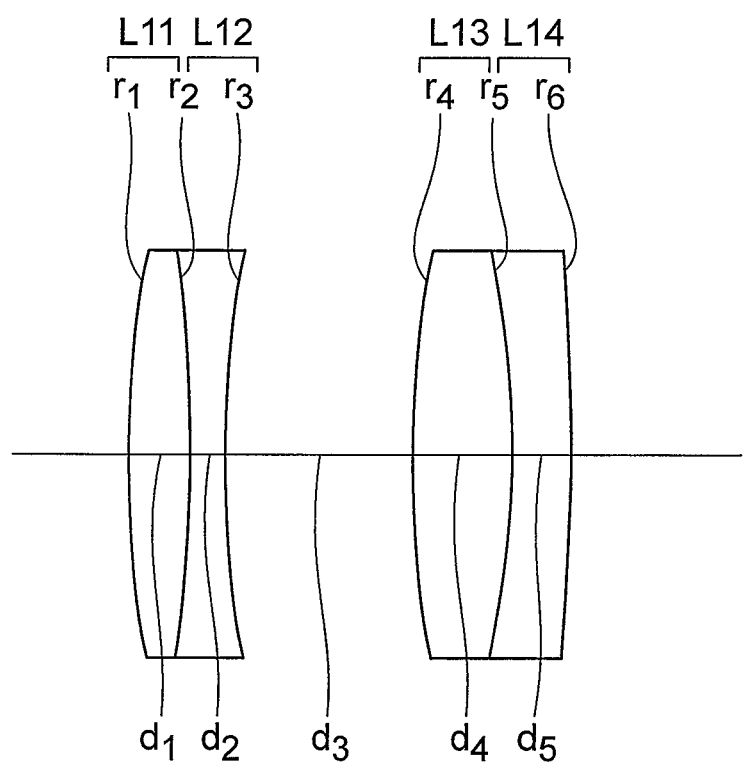
FIG. 17 is a cross-sectional view of a tube lens.

FIGS. 1 to 3 are cross-sectional views along the optical axes, showing the optical arrangements of the immersion microscope objectives according to examples 1 to 3, respectively. In these cross-sectional views, reference numerals L1 to L14 denote lenses. FIG. 17 is a cross-sectional view of a tube lens. The object side means a sample side.

The immersion microscope objectives of the examples 1 to 3 are infinity-corrected microscope objectives. In an infinity-corrected microscope objective, light rays exiting the microscope objective are collimated, so an image is not formed in itself. Therefore, the parallel light beam is made to converge by a tube lens as shown in FIG. 17, for example. An image of a sample plane is formed at the position where the parallel light beam converges.

An objective according to the example 1 will now be described. As shown in FIG. 1, the objective of the example 1 includes, in order from an object side, a first lens group G1, a second lens group G2, and a third lens group G3.

The first lens group G1 has a positive refractive power. The first lens group G1 includes, in order from the object side, a planoconvex positive lens L1, a negative meniscus lens L2 having a convex surface facing an image side, a positive meniscus lens L3 having a convex surface facing the image side, a biconvex positive lens L4, a biconcave negative lens L5, and a positive meniscus lens L6 having a convex surface facing the object side. Here, the planoconvex positive lens L1 and the negative meniscus lens L2 are cemented together. Further, the biconvex positive lens L4, the biconcave negative lens L5, and the positive meniscus lens L6 are cemented together.

The second lens group G2 has a positive refractive power. The second lens group G2 includes, in order from the object side, a biconvex positive lens L7, and a negative meniscus lens L8 having a convex surface facing the image side. Here, the biconvex positive lens L7 and the negative meniscus lens L8 are cemented together.

The third lens group G3 has a positive refractive power. The third lens group G3 includes, in order from the object side, a planoconvex positive lens L9, a biconvex positive lens L10, a biconcave negative lens L11, a negative meniscus lens L12 having a convex surface facing the image side, and a biconvex positive lens L13. Here, the biconvex positive lens L10 and the biconcave negative lens L11 are cemented together.

The third lens group G3 causes the divergent light beam to converge, and then causes the converging light beam to diverge. More specifically, the planoconvex positive lens L9, the biconvex positive lens L10, and the biconcave negative lens L11 cause the divergent light beam to converge, and the negative meniscus lens L12 causes the converging light beam to diverge.

The first lens group G1 and the third lens group G3 are stationary all the time (with their positions fixed). On the other hand, the second lens group G2 moves along the optical axis, between the first lens group G1 and the third lens group G3.

Next, an objective according to the example 2 will be described. As shown in FIG. 2, the objective of the example 2 includes, in order from an object side, a first lens group G1, a second lens group G2, and a third lens group G3.

The first lens group G1 has a positive refractive power. The first lens group G1 includes, in order from the object side, a planoconvex positive lens L1, a negative meniscus lens L2 having a convex surface facing an image side, a positive meniscus lens L3 having a convex surface facing the image side, a biconvex positive lens L4, a biconcave negative lens L5, and a planoconvex positive lens L6. Here, the planoconvex positive lens L1 and the negative meniscus lens L2 are cemented together. Further, the biconvex negative lens L5 and the planoconvex positive lens L6 are cemented together.

The second lens group G2 has a positive refractive power. The second lens group G2 includes, in order from the object side, a biconvex positive lens L7, and a planoconcave negative lens L8. Here, the biconvex positive lens L7 and the planoconcave negative lens L8 are cemented together.

The third lens group G3 has a positive refractive power. The third lens group G3 includes, in order from the object side, a biconvex positive lens L9, a biconvex positive lens L10, a biconcave negative lens L11, a negative meniscus lens L12 having a convex surface facing the image side, and a biconvex positive lens L13. Here, the biconvex positive lens L10 and the biconcave negative lens L11 are cemented together.

The third lens group G3 causes the divergent light beam to converge, and then causes the converging light beam to diverge. More specifically, the biconvex positive lens L9, the biconvex positive lens L10, and the biconcave negative lens L11 cause the divergent light beam to converge, and the negative meniscus lens L12 causes the converging light beam to diverge.

The first lens group G1 and the third lens group G3 are stationary all the time (with their positions fixed). On the other hand, the second lens group G2 moves along the optical axis, between the first lens group G1 and the third lens group G3.

Next, an objective according to the example 3 will be described. As shown in FIG. 3, the objective of the example 3 includes, in order from an object side, a first lens group G1, a second lens group G2, and a third lens group G3.

The first lens group G1 has a positive refractive power. The first lens group G1 includes, in order from the object side, a planoconvex positive lens L1, a negative meniscus lens L2 having a convex surface facing an image side, a positive meniscus lens L3 having a convex surface facing the image side, a biconvex positive lens L4, a biconcave negative lens L5, and a positive meniscus lens L6 having a convex surface facing the object side. Here, the planoconvex positive lens L1 and the negative meniscus lens L2 are cemented together. Further, the biconvex positive lens L4, the biconcave negative lens L5, and the positive meniscus lens L6 are cemented together.

The second lens group G2 has a positive refractive power. The second lens group G2 includes, in order from the object side, a biconvex positive lens L7, and a negative meniscus lens L8 having a convex surface facing the image side. Here, the biconvex positive lens L7 and the negative meniscus lens L8 are cemented together.

The third lens group G3 has a positive refractive power. The third lens group G3 includes, in order from the object side, a planoconvex positive lens L9, a biconvex positive lens L10, a biconcave negative lens L11, a negative meniscus lens L12 having a convex surface facing the image side, a negative meniscus lens L13 having a convex surface facing the image side, and a biconvex positive lens L14. Here, the biconvex positive lens L10 and the biconcave negative lens L11 are cemented together. Further, the negative meniscus lens L12 and the negative meniscus lens L13 are cemented together.

The third lens group G3 causes the divergent light beam to converge, and then causes the converging light beam to diverge. More specifically, the planoconvex positive lens L9, the biconvex positive lens L10, and the biconcave negative lens L11 cause the divergent light beam to converge, and the negative meniscus lens L12 and the negative meniscus lens L13 cause the converging light beam to diverge.

The first lens group G1 and the third lens group G3 have their positions fixed, whereas the second lens group G2 is a moving group which moves along the optical axis between the first lens group G1 and the third lens group G3.

Numerical data of optical members forming the objective of each of the above-described examples will be given below. In the numerical data for each example, r denotes a radius of curvature of each lens surface, d denotes a thickness of each lens or an air space, n900 denotes the refractive index of each lens at the wavelength of 900 nm, nd denotes the refractive index of each lens for the d-line, vd denotes an Abbe number of each lens, NA denotes a numerical aperture, f denotes a focal length of the objective, and $\beta_m$ denotes a magnification. In the example 1, r1 and r2 are virtual surfaces. In the examples 2 and 3, r1 is a virtual surface. In the example 1, d1 denotes a thickness of a cover glass, and d2 denotes a thickness of an immersion liquid layer. In the examples 2 and 3, d1 denotes a thickness of an immersion liquid layer. Further, the magnification $\beta_m$ is a magnification when the objective is combined with a tube lens (having a focal length of 180 mm) which will be described later.

In a numerical example 1, when the value of d1 is zero, it means that there is no cover glass between the sample and the objective. In this state, an image of the sample is formed via the immersion liquid. Further, in this case, the virtual surfaces r1 and r2 each indicate a boundary between the immersion liquid and the sample plane.

On the other hand, in the numerical example 1, when the value of d1 is not zero, it means that there is a cover glass between the sample and the objective. In this state, an image of the sample is formed via the cover glass and the immersion liquid. Further, in this case, the virtual surface r1 indicates a boundary between the sample plane and the cover glass, and the virtual surface r2 indicates a boundary between the cover glass and the immersion liquid. If the cover glass is regarded as a sample, the virtual surface r2 becomes the boundary between the immersion liquid and the sample plane, and the virtual surface r1 becomes an interior of the sample. It is thus evident that the interior of the sample can be observed.

In numerical examples 2 and 3, there is no cover glass between the sample and the objective. Therefore, the virtual surface r1 indicates a boundary between the immersion liquid and the sample plane.

In each of the objectives of the examples 1 to 3, the second lens group moves in the optical axis direction. This makes it possible to obtain a favorable image of the sample, irrespective of the change in the type of the immersion liquid.

It should be noted that the surface data in the numerical examples 1 to 3 show the numerical values in a state 1. Differences among states 1 to 5 are as follows. Further, in the numerical example 1, numerical values in each of the states 1 to 5 are shown in the column of various data. In the numerical examples 2 and 3, numerical values in each of the states 1 to 4 are shown in the column of various data. The radius of curvature r and the surface separation d are shown in millimeters (mm).

|  | Cover glass | Immersion liquid |
| --- | --- | --- |
| State 1 | absent | Liquid A |
| State 2 | absent | Liquid B |
| State 3 | absent | Liquid C |
| State 4 | absent | Liquid D |
| State 5 | present | Liquid A |

Example 1

NA = 0.6, f = 18 mm, $\beta_m$ = −10, field number = 18

Surface data

| Surface no. | r | d | n900 | nd | vd |
| --- | --- | --- | --- | --- | --- |
| 1 | ∞ | d1 | | | |
| 2 | ∞ | d2 | 1.37174 | 1.37919 | 52.40 |
| 3 | ∞ | 3.2500 | 1.45182 | 1.45852 | 67.83 |
| 4 | −9.4809 | 5.0767 | 1.86397 | 1.88300 | 40.76 |
| 5 | −13.1370 | 0.1513 | | | |
| 6 | −37.7636 | 2.4397 | 1.58713 | 1.59522 | 67.74 |
| 7 | −20.6052 | 0.1508 | | | |
| 8 | 27.2957 | 4.1908 | 1.58713 | 1.59522 | 67.74 |
| 9 | −45.9848 | 2.0000 | 1.55948 | 1.56883 | 56.36 |
| 10 | 11.1534 | 5.0937 | 1.72789 | 1.74100 | 52.64 |
| 11 | 26.1089 | d11 | | | |
| 12 | 51.8641 | 6.5884 | 1.43436 | 1.43875 | 94.93 |
| 13 | −11.9781 | 2.0000 | 1.62408 | 1.63775 | 42.41 |
| 14 | −82.0703 | d14 | | | |
| 15 | 18.2303 | 4.7338 | 1.58713 | 1.59522 | 67.74 |
| 16 | ∞ | 0.1501 | | | |
| 17 | 13.3276 | 7.0793 | 1.43436 | 1.43875 | 94.93 |
| 18 | −24.0061 | 2.0000 | 1.62408 | 1.63775 | 42.41 |
| 19 | 8.8307 | 7.4649 | | | |
| 20 | −7.8060 | 9.4283 | 1.71843 | 1.73800 | 32.26 |
| 21 | −15.1333 | 0.1500 | | | |
| 22 | 68.1842 | 4.0245 | 1.59433 | 1.60300 | 65.44 |
| 23 | −68.1842 | | | | |

NA = 0.6, f = 18 mm, $\beta_m$ = −10, field number = 18

Various data

|  | d | n900 | nd | vd |
| --- | --- | --- | --- | --- |
| State 1 | | | | |
| d1 | 0.0000 | | | |
| d2 | 8.0404 | 1.37174 | 1.37919 | 52.40 |
| d11 | 3.4828 | | | |
| d14 | 1.4308 | | | |
| State 2 | | | | |
| d1 | 0.0000 | | | |
| d2 | 7.7760 | 1.32666 | 1.33304 | 55.79 |
| d11 | 4.4127 | | | |
| d14 | 0.5009 | | | |
| State 3 | | | | |
| d1 | 0.0000 | | | |
| d2 | 8.1901 | 1.39737 | 1.40410 | 51.90 |
| d11 | 2.9748 | | | |
| d14 | 1.9389 | | | |
| State 4 | | | | |
| d1 | 0.0000 | | | |
| d2 | 8.8179 | 1.50443 | 1.51483 | 41.00 |
| d11 | 1.0790 | | | |
| d14 | 3.8346 | | | |
| State 5 | | | | |
| d1 | 0.1700 | 1.51193 | 1.52100 | 56.02 |
| d2 | 7.8864 | 1.37174 | 1.37919 | 52.40 |
| d11 | 3.4430 | | | |
| d14 | 1.4706 | | | |

Example 2

NA = 0.5, f = 18 mm, $\beta_m$ = −10, field number = 18

Surface data

| Surface no. | r | d | n900 | nd | vd |
| --- | --- | --- | --- | --- | --- |
| 1 | ∞ | d1 | 1.37174 | 1.37919 | 52.40 |
| 2 | ∞ | 3.3599 | 1.45182 | 1.45852 | 67.83 |
| 3 | −8.5349 | 5.7610 | 1.86397 | 1.88300 | 40.76 |
| 4 | −13.3099 | 0.1000 | | | |
| 5 | −61.7840 | 2.2828 | 1.59433 | 1.60300 | 65.44 |
| 6 | −23.9253 | 0.1000 | | | |
| 7 | 43.0649 | 2.6476 | 1.58713 | 1.59522 | 67.74 |
| 8 | −81.7472 | 1.5943 | | | |
| 9 | −24.4362 | 1.5000 | 1.55948 | 1.56883 | 56.36 |
| 10 | 12.9964 | 4.8383 | 1.74161 | 1.75500 | 52.32 |
| 11 | ∞ | d11 | | | |
| 12 | 31.4810 | 5.8261 | 1.43436 | 1.43875 | 94.93 |
| 13 | −13.6472 | 1.5000 | 1.62408 | 1.63775 | 42.41 |
| 14 | ∞ | d14 | | | |
| 15 | 15.3057 | 4.6653 | 1.58713 | 1.59522 | 67.74 |
| 16 | −153.1223 | 0.1241 | | | |
| 17 | 11.2667 | 5.7945 | 1.43436 | 1.43875 | 94.93 |
| 18 | −21.1672 | 1.5000 | 1.62408 | 1.63775 | 42.41 |
| 19 | 6.4078 | 6.1773 | | | |
| 20 | −6.8909 | 13.6132 | 1.71843 | 1.73800 | 32.26 |
| 21 | −17.7706 | 0.1000 | | | |
| 22 | 55.1103 | 3.2735 | 1.58713 | 1.59522 | 67.74 |
| 23 | −103.2954 | | | | |

-continued

NA = 0.5, f = 18 mm, β_m = −10, field number = 18

Various data

|     | d      | n900    | nd      | vd    |
|-----|--------|---------|---------|-------|
|     |        | State 1 |         |       |
| d1  | 8.0565 | 1.37174 | 1.37919 | 52.40 |
| d11 | 4.3942 |         |         |       |
| d14 | 1.7534 |         |         |       |
|     |        | State 2 |         |       |
| d1  | 7.7921 | 1.32666 | 1.33304 | 55.79 |
| d11 | 5.6197 |         |         |       |
| d14 | 0.5279 |         |         |       |
|     |        | State 3 |         |       |
| d1  | 8.2063 | 1.39737 | 1.40410 | 51.90 |
| d11 | 3.8864 |         |         |       |
| d14 | 2.2612 |         |         |       |
|     |        | State 4 |         |       |
| d1  | 8.8339 | 1.50443 | 1.51483 | 41.00 |
| d11 | 0.8740 |         |         |       |
| d14 | 5.2736 |         |         |       |

Example 3

NA = 0.6, f = 18 mm, β_m = −10, field number = 18

Surface data

| Surface no. | r         | d      | n900    | nd      | vd    |
|-------------|-----------|--------|---------|---------|-------|
| 1           | ∞         | d1     | 1.37174 | 1.37919 | 52.40 |
| 2           | ∞         | 3.2500 | 1.45182 | 1.45852 | 67.83 |
| 3           | −9.5947   | 5.2495 | 1.86397 | 1.88300 | 40.76 |
| 4           | −13.5473  | 0.1499 |         |         |       |
| 5           | −31.4510  | 2.6220 | 1.58713 | 1.59522 | 67.74 |
| 6           | −17.4068  | 0.1499 |         |         |       |
| 7           | 24.5430   | 3.9329 | 1.58713 | 1.59522 | 67.74 |
| 8           | −97.5616  | 2.0000 | 1.55948 | 1.56883 | 56.36 |
| 9           | 10.9553   | 4.7298 | 1.72789 | 1.74100 | 52.64 |
| 10          | 21.7381   | d10    |         |         |       |
| 11          | 50.9127   | 6.3409 | 1.43436 | 1.43875 | 94.93 |
| 12          | −12.0381  | 2.0000 | 1.62408 | 1.63775 | 42.41 |
| 13          | −84.6321  | d13    |         |         |       |
| 14          | 19.0634   | 4.3275 | 1.58713 | 1.59522 | 67.74 |
| 15          | ∞         | 0.1500 |         |         |       |
| 16          | 12.6059   | 6.9306 | 1.43436 | 1.43875 | 94.93 |
| 17          | −30.0974  | 2.0000 | 1.62408 | 1.63775 | 42.41 |
| 18          | 8.9655    | 7.6622 |         |         |       |
| 19          | −7.8332   | 2.5000 | 1.71843 | 1.73800 | 32.26 |
| 20          | −12.4093  | 7.0515 | 1.86397 | 1.88300 | 40.76 |
| 21          | −15.5355  | 0.1500 |         |         |       |
| 22          | 74.3438   | 3.7850 | 1.59433 | 1.60300 | 65.44 |
| 23          | −74.3438  | −2.8021|         |         |       |

Various data

|     | d      | n900    | nd      | vd    |
|-----|--------|---------|---------|-------|
|     |        | State 1 |         |       |
| d1  | 8.0503 | 1.37174 | 1.37919 | 52.40 |
| d10 | 3.0629 |         |         |       |
| d13 | 1.6232 |         |         |       |
|     |        | State 2 |         |       |
| d1  | 7.7857 | 1.32666 | 1.33304 | 55.79 |
| d10 | 4.0561 |         |         |       |
| d13 | 0.6300 |         |         |       |
|     |        | State 3 |         |       |
| d1  | 8.2001 | 1.39737 | 1.40410 | 51.90 |
| d10 | 2.5173 |         |         |       |
| d13 | 2.1688 |         |         |       |
|     |        | State 4 |         |       |
| d1  | 8.8285 | 1.50443 | 1.51483 | 41.00 |
| d10 | 0.5000 |         |         |       |
| d13 | 4.1862 |         |         |       |

Tube lens
Surface data

| Surface no. | r         | d       | n900    | nd      | vd    |
|-------------|-----------|---------|---------|---------|-------|
| 1           | 95.2596   | 5.3317  | 1.56907 | 1.56907 | 71.30 |
| 2           | −116.2766 | 2.8267  | 1.50847 | 1.50847 | 61.19 |
| 3           | 80.4059   | 16.3504 |         |         |       |
| 4           | 92.0498   | 8.7567  | 1.48749 | 1.48749 | 70.23 |
| 5           | −73.2447  | 4.8745  | 1.62408 | 1.63775 | 42.41 |
| 6           | −292.4080 |         |         |         |       | focal length 180 mm

At the time of combining the objective of each example with a tube lens, the distance between the objective and the tube lens may be set within a range from 50 mm to 170 mm.

FIGS. 4A, 4B, 4C, and 4D to FIGS. 16A, 16B, 16C, and 16D are aberration diagrams according to ray traces from the image side when the objectives of the respective examples 1 to 3 were combined with a tube lens. The aberration diagrams show the aberrations in the following states. The distance between the objective of each example and the tube lens was 120 mm.

| Example         | State     |
|-----------------|-----------|
| FIGS. 4A to 4D  | Example 1 | State 1 |
| FIGS. 5A to 5D  | Example 1 | State 2 |
| FIGS. 6A to 6D  | Example 1 | State 3 |
| FIGS. 7A to 7D  | Example 1 | State 4 |
| FIGS. 8A to 8D  | Example 1 | State 5 |
| FIGS. 9A to 9D  | Example 2 | State 1 |
| FIGS. 10A to 10D| Example 2 | State 2 |
| FIGS. 11A to 11D| Example 2 | State 3 |
| FIGS. 12A to 12D| Example 2 | State 4 |
| FIGS. 13A to 13D| Example 3 | State 1 |
| FIGS. 14A to 14D| Example 3 | State 2 |
| FIGS. 15A to 15D| Example 3 | State 3 |
| FIGS. 16A to 16D| Example 3 | State 4 |

Further, in these aberration diagrams, "FIY" denotes an image height. FIGS. 4A, 5A, 6A, 7A, 8A, 9A, 10A, 11A, 12A, 13A, 14A, 15A, and 16A each show spherical aberration (SA), FIGS. 4B, 5B, 6B, 7B, 8B, 9B, 10B, 11B, 12B, 13B, 14B, 15B, and 16B each show offense against the sine condition (OSC), FIGS. 4C, 5C, 6C, 7C, 8C, 9C, 10C, 11C, 12C, 13C, 14C, 15C, and 16C each show astigmatism (AS), and FIGS. 4D, 5D, 6D, 7D, 8D, 9D, 10D, 11D, 12D, 13D, 14D, 15D, and 16D each show coma (DZY). In the graph of coma (DZY), the vertical axis represents an image height ratio.

Figure 19:
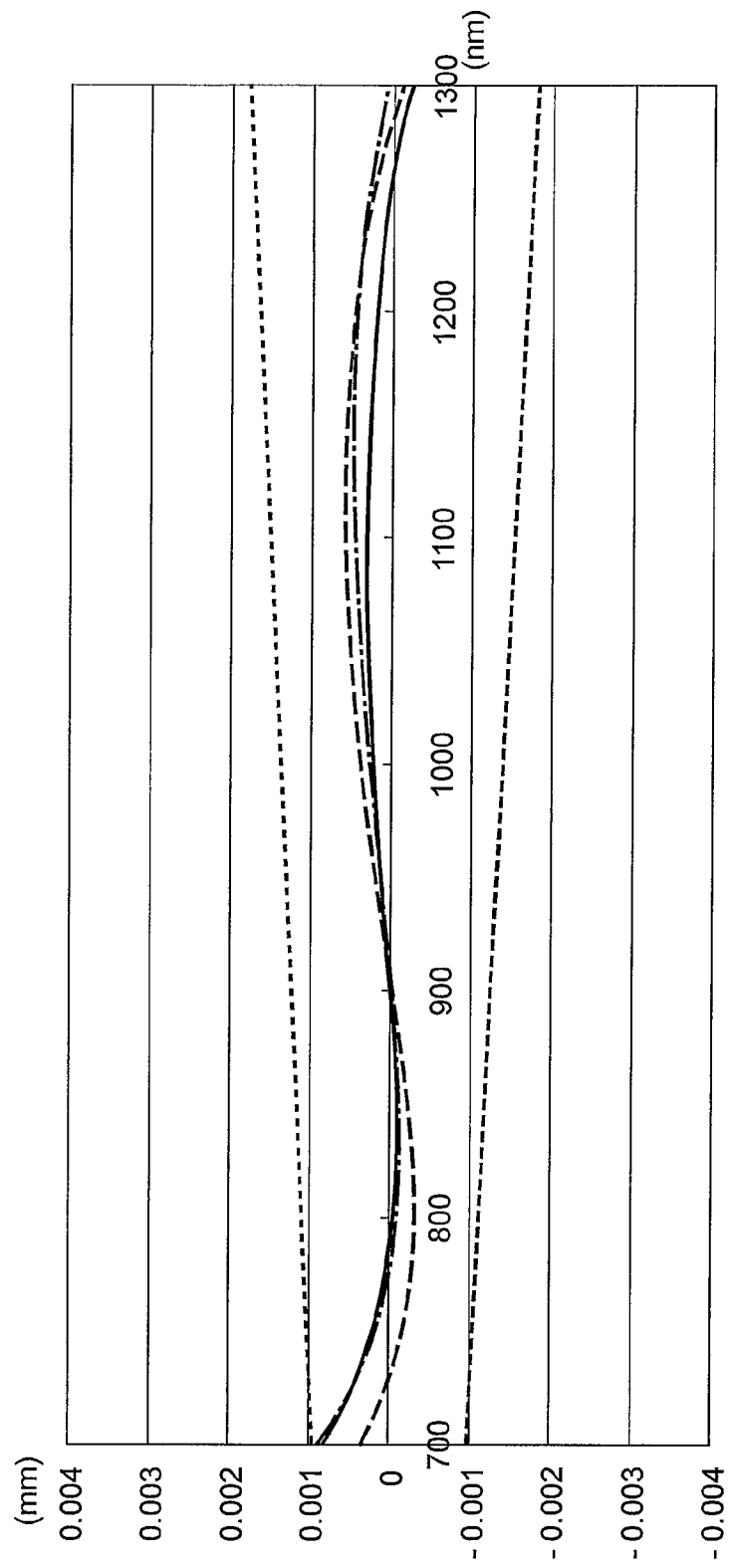
FIG. 19 is a diagram illustrating the amounts of chromatic aberration which occurred in the immersion microscope objectives of the examples.

The amounts of chromatic aberration which occurred in the objectives of the examples are shown in FIG. 19. In FIG. 19, the vertical axis represents distance, with "0" being the focal position, and the horizontal axis represents wavelength. The dotted lines show upper and lower limits of the focal depth. The solid line, broken line, and dot-dash line show the amounts of chromatic aberration that occurred in three objectives, i.e. the objectives according to the present examples.

As shown in FIG. 19, in the range of about 700 nm and greater, the solid line, broken line, and dot-dash line are all within the upper and lower limits shown by the dotted lines. This means that, in the objectives according to the present examples, chromatic aberration is favorably corrected over the wide range of the infrared region.

Next, the values of conditional expressions (1) to (6) in each example are shown below.

| Conditional expressions | Example1 | Example2 | Example3 |
|---|---|---|---|
| (1) $d_0 \times f \times NA_o$ | 86.832 | 72.45 | 86.94 |
| (2) $d_0 \times f/(|r_1| \times L)$ | 0.19322 | 0.22636 | 0.19411 |
| (3) $d_0 \times d_3/L^2$ | 0.01215 | 0.01948 | 0.0127 |
| (4) $(nd_{01} \times d_{01} - nd_{02} \times d_{02}) \times f/L^2$ | 0.0087 | 0.00966 | 0.00898 |
| (5) $|\alpha/\beta|$ | 0.94162 | 0.94157 | 1.01567 |
| (6) $nd_2 - nd_1$ | 0.42448 | 0.42448 | 0.42448 |

Figure 20:
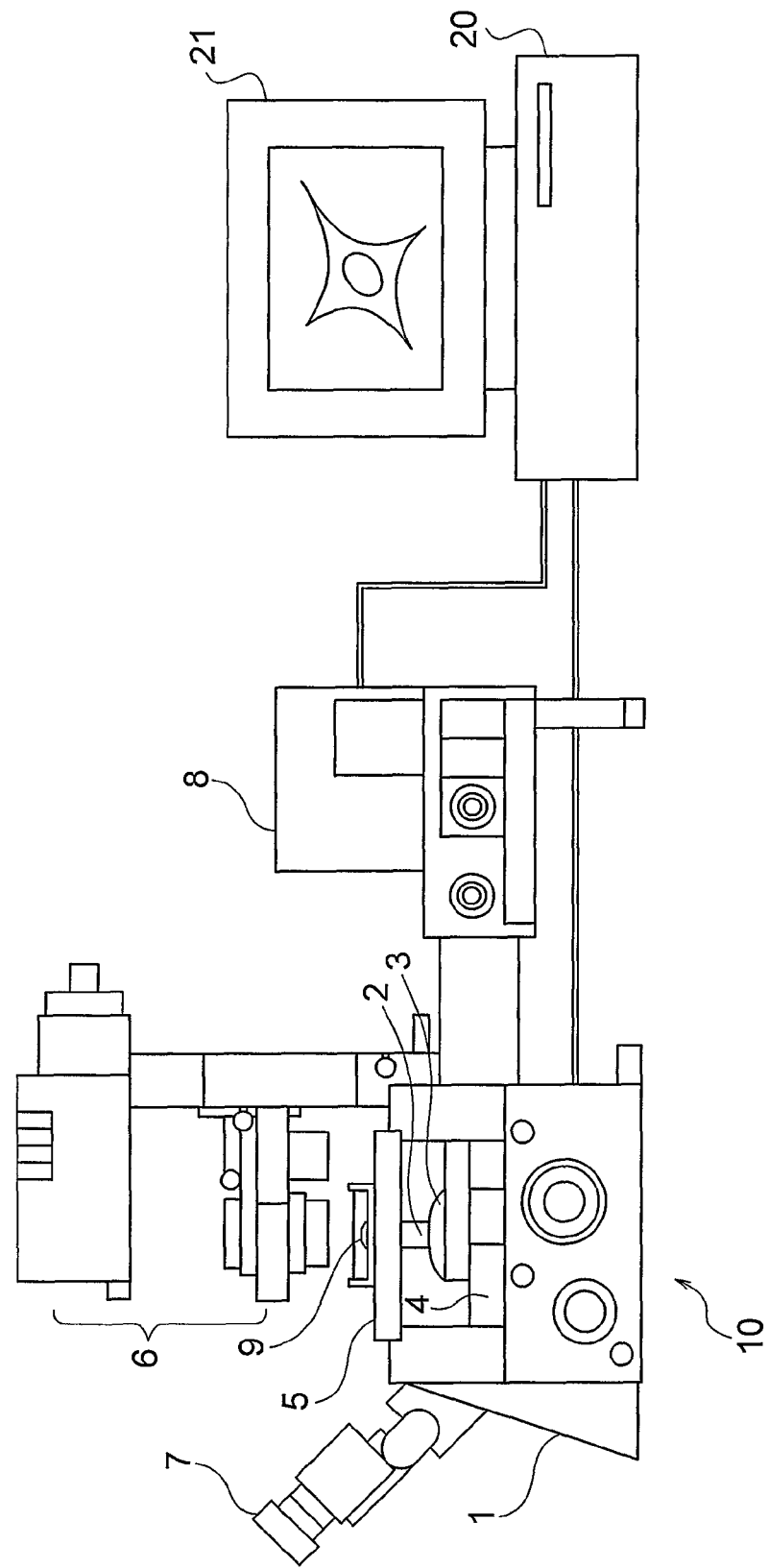
FIG. 20 is a diagram of a microscope having the immersion microscope objective of the present invention used therein.

FIG. 20 is a diagram showing the microscope according to the present embodiment. In FIG. 20, an example of an external structure of a laser scanning microscope is shown as an example of the microscope. As shown in FIG. 20, a microscope 10 includes a main body section 1, an objective 2, a revolver 3, an objective raising and lowering mechanism 4, a stage 5, an epi-illumination unit 6, an observation lens barrel 7, and a scanner 8. Moreover, an image processing apparatus 20 is connected to the microscope 10, and an image display apparatus 21 is connected to the image processing apparatus 20. In the microscope according to the present embodiment, the immersion microscope objective according to the present embodiment is used for the objective 2.

The stage 5 is provided to the main body section 1. A sample 9 is to be placed on the stage 5. Moreover, the epi-illumination unit 6 is provided at an upper side of the main body section 1. Epi-illumination visible light is irradiated to the sample 9 by the epi-illumination unit 6. Light from the sample 9 travels through the objective 2, and reaches the observation lens barrel 7. A user is able to observe the sample 9 through the observation lens barrel 7 in visible light.

Moreover, a laser source (not shown in the diagram) and the scanner 8 are provided at a rear side (right side of a paper surface) of the main body section 1. The laser source and the scanner 8 are connected by a fiber (not shown in the diagram). The scanner 8 includes a galvanometer scanner and a photo detection element, which are disposed at an interior of the scanner 8. The laser source is a laser which generates an infrared light that can operate two-photon excitation. Light from the laser source, after travelling through the scanner 8 is incident on the objective 2. The objective 2 is positioned at a lower side of the stage 5. Therefore, the sample 9 is illuminated from a lower side as well.

Light (reflected light or fluorescent light) from the sample 9, upon travelling through the objective 2, passes through the scanner 8, and is detected by the photo detection element. In the two-photon excitation, since fluorescent light generates only focal point, a confocal observation is possible. In the confocal observation, it is possible to obtain a cross-sectional image of the sample 9.

The objective raising and lowering mechanism 4 is connected to the revolver 3. The objective raising and lowering mechanism 4 is capable of moving the objective 2 (the revolver 3) along an optical axial direction. In a case in which, a plurality of cross-sectional images along the optical axial direction of the sample 9 are to be obtained, the objective 2 is to be moved by the objective raising and lowering mechanism 4.

A signal obtained by the photo detection element is transmitted to the image processing apparatus 20. An image processing is carried out in the image processing apparatus 20, and an image of the sample 9 is displayed on the image display apparatus 21.

In the example described above, the immersion microscope objective according to the present embodiment has been used for the two-photon excitation observation. However, it is also possible to use the immersion microscope objective according to the present embodiment for a total internal reflection fluorescence observation. In such case, a diameter of a bundle of rays from the laser source is to be kept smaller than an effective aperture of the immersion microscope objective. Moreover, an arrangement is to be made such that, the bundle of rays from the laser source is made to be incident on the immersion microscope objective such that it does not include an optical axis of the immersion microscope objective.

Moreover, in the present embodiment, the immersion microscope objective is used also for an observation of visible light. If in a case in which, the aberration performance in a visible region is not sufficient, an objective for observing visible light and an objective for observing two-photon excitation may be installed on a revolver 3, and may be switched according to the method of observation.

According to the present invention, it is possible to provide an immersion microscope objective which enables observation over a wider area of a sample and also enables observation of a deeper portion of the sample with high resolving power, and also provide a microscope using the immersion microscope objective.

The present invention can have various modified examples without departing from the scope of the invention.

As described above, the present invention is suitably applicable to an immersion microscope objective which enables observation over a wider area of a sample, and also enables observation of a deeper portion of the sample with high resolving power, and to a microscope using the immersion microscope objective.

What is claimed is:

1. An immersion microscope objective comprising, in order from an object side:
    a first lens group;
    a second lens group; and
    a third lens group; wherein
    the first lens group has a positive refractive power and includes a first cemented lens disposed nearest to the object side in the first lens group,
    the second lens group includes a second cemented lens,
    the third lens group includes a lens component that has a positive refractive power and changes a divergent light beam incident from the second lens group to a convergent light beam, one or more lens components that change the convergent light beam to a divergent light beam, and a lens component that has a positive refractive power and changes the divergent light beam to a parallel light beam and emits the parallel light beam, and
    the following conditional expressions (1) is satisfied:

$$60 \text{ mm}^2 d_0 \times f \times NA_o \leq 500 \text{ mm}^2 \quad (1)$$

where $d_0$ denotes a working distance of the immersion microscope objective, f denotes a focal length of the immersion microscope objective, $NA_o$ denotes an object-side numerical aperture of the immersion microscope objective, and each of the lens components of the third lens group is a single lens or a cemented lens.

2. The immersion microscope objective according to claim 1, wherein the following conditional expression (2) is satisfied:

$$0.15 \leq d_0 \times f/(|r_1| \times L) \leq 10 \quad (2)$$

where $d_0$ denotes the working distance of the immersion microscope objective, f denotes the focal length of the immersion microscope objective, $r_1$ is a radius of curvature of a cemented surface of the first cemented lens, and L denotes a distance on an optical axis from a sample plane to a lens surface nearest to an image side in the immersion microscope objective.

3. The immersion microscope objective according to claim 1, wherein the one or more lens components in the third lens group that change the convergent light beam to a divergent light beam comprise two lens components, and the two lens components in the third lens group include a third cemented lens having a concave surface facing the image side and a lens component having a concave surface facing the object side, the lens component having the concave surface facing the object side is disposed opposed to the third cemented lens, and the following conditional expression (3) is satisfied:

$$0.01 \leq d_0 \times d_3/L^2 \leq 0.15 \quad (3)$$

where $d_0$ denotes the working distance of the immersion microscope objective, $d_3$ denotes a thickness on the optical axis of the lens component having the concave surface facing the object side, L denotes the distance on the optical axis from the sample plane to the lens surface nearest to the image side in the immersion microscope objective, and the lens component is a single lens or a cemented lens.

4. The immersion microscope objective according to claim 1, comprising a moving lens group that moves along the optical axis, wherein the following conditional expression (4) is satisfied:

$$0.004 \leq ((nd_{01} \times d_{01}) - (nd_{02} \times d_{02})) \times f/L^2 \leq 0.03 \quad (4)$$

where $nd_{01}$ denotes a maximum refractive index of refractive indices of a plurality of immersion liquids, for a d-line, $d_{01}$ denotes a working distance during use of the immersion liquid with $nd_{01}$, $nd_{02}$ denotes a minimum refractive index of the refractive indices of the plurality of immersion liquids, for the d-line, $d_{02}$ denotes a working distance during use of the immersion liquid with $nd_{02}$, f denotes the focal length of the immersion microscope objective, and L denotes the distance on the optical axis from the sample plane to the lens surface nearest to the image side in the immersion microscope objective.

5. The immersion microscope objective according to claim 4, wherein:

the moving lens group is the second lens group, and the second lens group moves along the optical axis between the first lens group and the third lens group.

6. The immersion microscope objective according to claim 4, wherein the following conditional expression (5) is satisfied:

$$0.9 < |\alpha/\beta| < 1.1 \quad (5)$$

where $\alpha$ denotes an angle between a prescribed principal ray incident on the second lens group and the optical axis, $\beta$ denotes an angle between the prescribed principal ray exiting the second lens group and the optical axis, and the prescribed principal ray is a principal ray that has a largest angle with the optical axis at a pupil position.

7. A microscope comprising:

a scanner section;

a main-body section; and a microscope objective, wherein the immersion microscope objective described in claim 1 is used for the microscope objective.

8. An immersion microscope objective comprising, in order from an object side:

a first lens group;

a second lens group; and a third lens group; wherein the first lens group has a positive refractive power, the second lens group includes at least one cemented lens, the third lens group includes a lens component that changes a divergent light beam incident from the second lens group to a convergent light beam, one or more lens components that change the convergent light beam to a divergent light beam, and a lens component that changes the divergent light beam to a parallel light beam and emits the parallel light beam, and the following conditional expression (1-1) is satisfied:

$$60 \text{ mm}^2 \leq d_0 \times f \times NA_o \quad (1\text{-}1)$$

where $d_0$ denotes a working distance of the immersion microscope objective, f denotes a focal length of the immersion microscope objective, $NA_o$ denotes an object-side numerical aperture of the immersion microscope objective, and each of the lens components of the third lens group is a single lens or a cemented lens.

9. The immersion microscope objective according to claim 8, wherein chromatic aberration is corrected at least in a wavelength region from 700 nm to 1300 nm.

* * * * *

UNITED STATES PATENT AND TRADEMARK OFFICE
CERTIFICATE OF CORRECTION

PATENT NO. : 9,709,790 B2
APPLICATION NO. : 14/508806
DATED : July 18, 2017
INVENTOR(S) : Hirokazu Konishi Page 1 of 1

It is certified that error appears in the above-identified patent and that said Letters Patent is hereby corrected as shown below:

In the Claims

Column 18, Line 66, delete "60 mm$^2$d$_0$×f×NA$_o$≤500 mm$^2$" and insert
--60 mm$^2$≤d$_0$×f×NA$_o$≤500 mm$^2$--.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*